United States Patent
Toyota et al.

(10) Patent No.: US 10,358,136 B2
(45) Date of Patent: Jul. 23, 2019

(54) VEHICLE TRANSMISSION CONTROL DEVICE

(71) Applicant: Nissan Motor Co., Ltd., Yokohama-shi, Kanagawa (JP)

(72) Inventors: Ryohey Toyota, Kanagawa (JP); Masato Koga, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 184 days.

(21) Appl. No.: 15/559,451

(22) PCT Filed: Apr. 8, 2016

(86) PCT No.: PCT/JP2016/061601
§ 371 (c)(1),
(2) Date: Sep. 19, 2017

(87) PCT Pub. No.: WO2016/167201
PCT Pub. Date: Oct. 20, 2016

(65) Prior Publication Data
US 2018/0118216 A1    May 3, 2018

(30) Foreign Application Priority Data
Apr. 14, 2015    (WO) .................. PCT/JP2015/061470

(51) Int. Cl.
*B60W 30/19*    (2012.01)
*B60W 10/02*    (2006.01)
(Continued)

(52) U.S. Cl.
CPC ............. *B60W 30/19* (2013.01); *B60K 6/442* (2013.01); *B60K 6/547* (2013.01); *B60W 10/02* (2013.01);
(Continued)

(58) Field of Classification Search
CPC ...... B60W 10/08; B60W 10/11; B60W 20/00; B60W 20/15; B60W 30/19
See application file for complete search history.

(56) References Cited

U.S. PATENT DOCUMENTS

2006/0108163 A1*    5/2006    Kitano ................... B60K 6/485
                                                             180/65.26
2008/0300744 A1    12/2008    Katsuta et al.
(Continued)

FOREIGN PATENT DOCUMENTS

| JP | 2005-90604 A | 4/2005 |
|---|---|---|
| JP | 2010-70033 A | 4/2010 |
| JP | 2012-86774 A | 5/2012 |

*Primary Examiner* — Edwin A Young
(74) *Attorney, Agent, or Firm* — Global IP Counselors, LLP

(57) ABSTRACT

In a hybrid vehicle, rotational speed control on a motor/generator connected to a first engagement clutch is carried out when there is a gear shift request to a gear shift stage at which the first engagement clutch of the multistage gear transmission is meshingly engaged. A transmission control unit is provided for outputting a meshing engagement instruction to the first engagement clutch when a rotational speed feedback control causes a differential rotation speed of the first engagement clutch to be within a range of a synchronization determination rotational speed. Upon executing the rotational speed feedback control on the motor/generator, this transmission control unit reduces the efficacy of the rotational speed feedback control less than before starting of the meshingly engagement, when the meshing engagement of the first engagement clutch is started.

12 Claims, 10 Drawing Sheets

(51) Int. Cl.
| | |
|---|---|
| *B60W 10/08* | (2006.01) |
| *B60W 10/11* | (2012.01) |
| *B60W 20/00* | (2016.01) |
| *F16H 61/32* | (2006.01) |
| *F16H 63/50* | (2006.01) |
| *B60K 6/442* | (2007.10) |
| *B60K 6/547* | (2007.10) |
| *B60W 20/15* | (2016.01) |
| F16H 59/46 | (2006.01) |
| F16H 59/40 | (2006.01) |
| F16H 59/36 | (2006.01) |
| F16H 59/68 | (2006.01) |
| F16H 59/14 | (2006.01) |
| F16H 61/04 | (2006.01) |
| B60W 50/00 | (2006.01) |

(52) U.S. Cl.
CPC ............ *B60W 10/08* (2013.01); *B60W 10/11* (2013.01); *B60W 20/00* (2013.01); *B60W 20/15* (2016.01); *F16H 61/32* (2013.01); *F16H 63/502* (2013.01); *B60W 2050/0008* (2013.01); *B60W 2510/0208* (2013.01); *B60W 2510/0283* (2013.01); *B60W 2510/081* (2013.01); *B60W 2510/104* (2013.01); *B60W 2510/1005* (2013.01); *B60W 2510/1015* (2013.01); *B60W 2710/021* (2013.01); *B60W 2710/028* (2013.01); *B60W 2710/081* (2013.01); *B60W 2710/083* (2013.01); *B60W 2710/1005* (2013.01); *B60Y 2200/92* (2013.01); *F16H 59/40* (2013.01); *F16H 2059/147* (2013.01); *F16H 2059/366* (2013.01); *F16H 2059/462* (2013.01); *F16H 2059/6807* (2013.01); *F16H 2061/0422* (2013.01); *F16H 2200/2094* (2013.01); *Y02T 10/6234* (2013.01); *Y10S 903/93* (2013.01)

(56) References Cited

U.S. PATENT DOCUMENTS

| | | | |
|---|---|---|---|
| 2011/0112709 A1* | 5/2011 | Park | B60K 6/448 701/22 |
| 2014/0222270 A1* | 8/2014 | Tsutsumi | B60W 20/40 701/22 |

\* cited by examiner

GEAR SHIFT PATTERN

| C2 | C3 | C1 | | |
|---|---|---|---|---|
| | | Left | N | Right |
| N | N | EV – ICEgen | Neutral | EV – ICE 3rd |
| | Left | EV 1st ICE 1st | EV 1st ICE – | EV 1st ICE 3rd |
| | | Lock | EV 1st ICE 2nd | Lock |
| Left | N | EV 1.5 ICE 2nd | EV – ICE 2nd | Lock |
| | Right | Lock | EV 2nd ICE 2nd | Lock |
| N | Right | EV 2nd ICE 3rd' | EV 2nd ICE – | EV 2nd ICE 3rd |
| | | Lock | EV 2nd ICE 4th | Lock |
| Right | N | EV 2.5 ICE 4th | EV – ICE 4th | Lock |
| | Left | Lock | EV 1st ICE 4th | Lock |

FIG. 4

VEHICLE TRANSMISSION CONTROL DEVICE

CROSS-REFERENCE TO RELATED APPLICATIONS

This application is a U.S. National stage application of International Application No. PCT/JP2016/061601, filed Apr. 8, 2016.

BACKGROUND

Field of the Invention

The present invention relates to a vehicle transmission control device, in which a transmission provided in a drive system has, as shifting elements that switch between gear shift stages, engagement clutches that mesh and engage by movement from disengaged positions.

Background Information

Conventionally, a control device for an automatic transmission is known in which, in an automatic transmission, comprising an engagement clutch that has a rotational speed control mechanism, during shifting in which the engagement clutch is meshingly engaged, a rotational speed feedback control (hereinbelow "feedback," referred to as "FB") of the electric motor is carried out to converge the differential rotation speed of the engagement clutch to the synchronization determination rotational speed. By carrying out rotational speed FB control, when the differential rotation speed becomes within a range of synchronization determination rotational speeds, meshing engagement of the engagement clutch is started, and the meshing engagement are completed while the rotational speed FB control is continued (for example, refer to Japanese Laid Open Patent Application No. 2005-90604-Patent Document 1).

SUMMARY

However, in a conventional automatic transmission control device, rotational speed FB control that converges an actual differential rotation speed of the engagement clutch to a target differential rotation speed is carried out, where a synchronization determination rotational speed set to a differential rotation speed that achieves a smooth meshing engagement operation of the engagement clutch is set as the target rotational speed. Consequently, in the rotational speed FB control, when the engagement clutch enters a meshing engagement state, the actual differential rotation speed becomes zero, and the rotational speed deviation generated between the actual differential rotation speed and the target differential rotation speed (synchronization determination rotational speed) is considered as disturbance in the control. Therefore, if the rotational speed FB control is continued when the engagement clutch enters a meshing engagement state until it is determined that the meshing engagement are completed, an FB torque that tries to match the actual differential rotation speed (zero rotation speed) to the target differential rotation speed (synchronization determination rotational speed) is generated. There is the problem that the FB torque imparts discomfort to the driver as vehicle shock.

In view of the problems described above, an object of the present invention is to provide a vehicle transmission control device that reduces vehicle shock caused by FB torque output due to rotational speed FB control, at the time of shifting when the engagement clutch is meshingly engaged based on a rotation synchronization determination.

In order to achieve the object described above, a vehicle of the present invention is equipped with a transmission that achieves a plurality of gear shift stages in a drive system from a power source to a driving wheel, in which the transmission has an engagement clutch as a shifting element that meshingly engages by movement from a disengaged position for switching between the gear shift stages. This vehicle is provided with a transmission controller that executes rotational speed FB control with respect to an electric motor connected to the engagement clutch at the time of a shift request to a gear shift stage at which the engagement clutch is meshingly engaged, and outputs a meshing engagement instruction to the engagement clutch when the differential rotation speed of the engagement clutch comes within a range of a synchronization determination rotational speed that is set to predetermined differential rotation speeds that are not zero rotation speed. Upon executing the rotational speed FB control on the electric motor, the transmission controller reduces an efficacy of rotational speed FB control for starting meshingly engagement of the engagement clutch as compared to before starting of the meshingly engagement.

As a result, it is possible to reduce vehicle shock caused by FB torque output due to rotational speed FB control at the time of shifting when the engagement clutch is meshingly engaged based on a rotation synchronization determination.

BRIEF DESCRIPTION OF THE DRAWINGS

Referring now to the drawings, a vehicle transmission control device is illustrated.

FIG. 4 is a gear shift pattern chart illustrating the gear shift patterns according to the switching positions of three engagement clutches in a multistage gear transmission mounted on a hybrid vehicle to which is applied the transmission control device of the first embodiment.

DETAILED DESCRIPTION OF THE EMBODIMENTS

Figure 1:
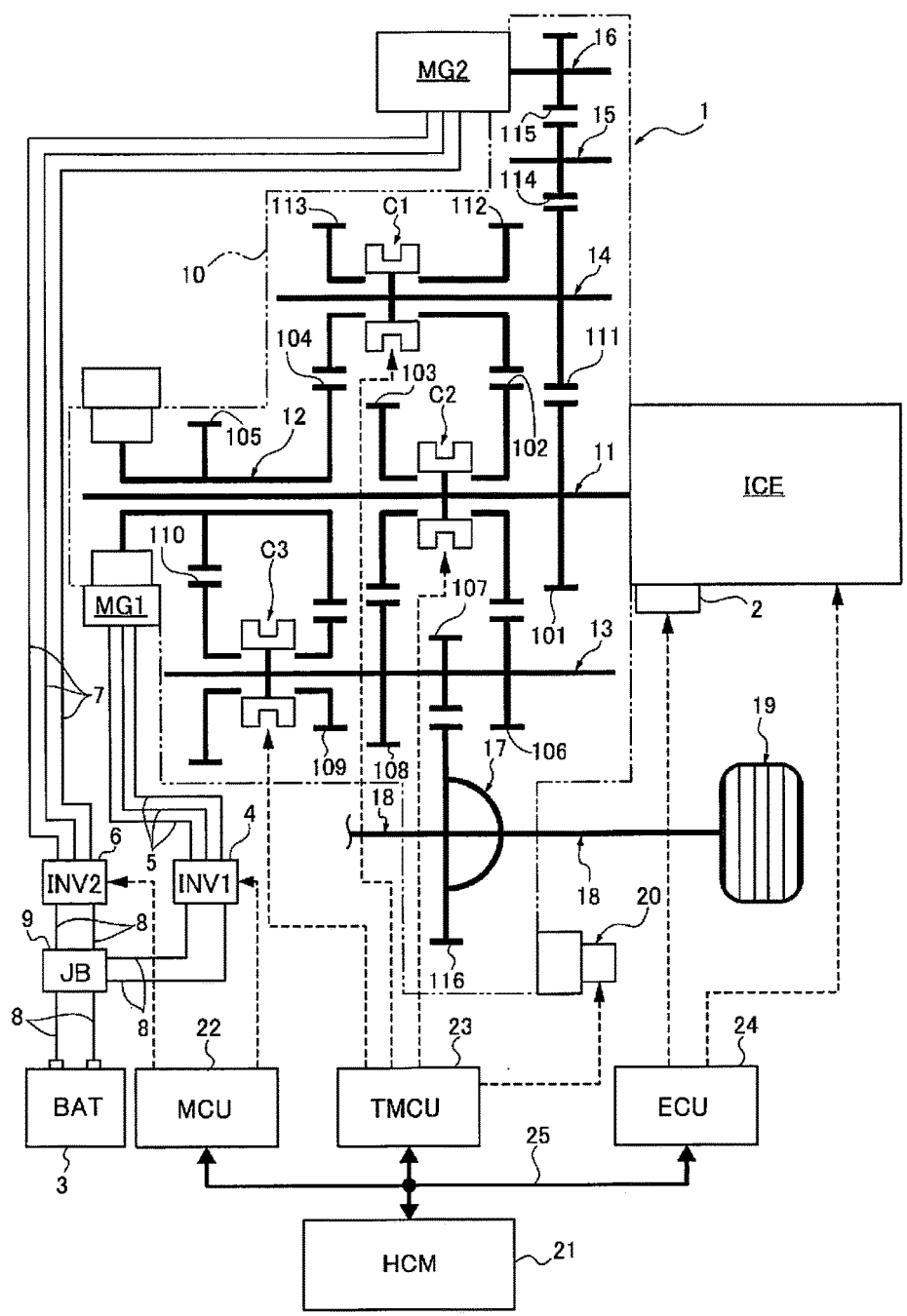
FIG. 1 is an overall system view illustrating a drive system and a control system of a hybrid vehicle to which is applied the transmission control device of a first embodiment.

A preferred embodiment for realizing the vehicle transmission control device according to the present invention is described below, based on first and second embodiments illustrated in the drawings.

First Embodiment

The configuration is described first. The transmission control device of the first embodiment is applied to a hybrid vehicle (one example of a vehicle), comprising, as drive system components, one engine, two motor/generators, and a multistage gear transmission having three engagement clutches. The "overall system configuration," the "configuration of the shift control system," the "configuration of the gear shift patterns," and the "configuration of the shift control process" will be separately described below, regarding the configuration of the transmission control device of a hybrid vehicle in the first embodiment.

Overall System Configuration

FIG. 1 illustrates a drive system and a control system of a hybrid vehicle to which is applied the transmission control device of the first embodiment. The overall system configuration will be described below, based on FIG. 1.

The drive system of the hybrid vehicle comprises an internal combustion engine ICE, a first motor/generator MG1, a second motor/generator MG2, and a multistage gear transmission 1 having three engagement clutches C1, C2, and C3, as illustrated in FIG. 1. "ICE" is an abbreviation for "Internal Combustion Engine."

The internal combustion engine ICE is, for example, a gasoline engine or a diesel engine disposed in a front compartment of a vehicle, such that the crankshaft direction is in the vehicle width direction. The internal combustion engine ICE is connected to a transmission case 10 of the multistage gear transmission 1, and the output shaft of the internal combustion engine is connected to a first shaft 11 of the multistage gear transmission 1. The internal combustion engine ICE basically carries out an MG2 start, where the second motor/generator MG2 is used as a starter motor. However, a starter motor 2 is left in preparation for when an MG2 start using a high power battery 3 cannot be ensured, such as during extreme cold.

Both the first motor/generator MG1 and the second motor/generator MG2 are permanent magnet types of synchronous motors utilizing a three-phase alternating current, having the high power battery 3 as a common power source. The stator of the first motor/generator MG1 is fixed to a case of the first motor/generator MG1, and the case is fixed to the transmission case 10 of the multistage gear transmission 1. Then, a first motor shaft integrated to a rotor of the first motor/generator MG1 is connected to a second shaft 12 of the multistage gear transmission 1. The stator of the second motor/generator MG2 is fixed to a case of the second motor/generator MG2, and the case is fixed to the transmission case 10 of the multistage gear transmission 1. Then, a second motor shaft integrated to a rotor of the second motor/generator MG2 is connected to a sixth shaft 16 of the multistage gear transmission 1. A first inverter 4, which converts direct current to three-phase alternating current during powering and converts three-phase alternating current to direct current during regeneration, is connected to a stator coil of the first motor/generator MG1, via a first AC harness 5. A second inverter 6, which converts direct current to three-phase alternating current during powering and converts three-phase alternating current to direct current during regeneration, is connected to a stator coil of the second motor/generator MG2, via a second AC harness 7. The high power battery 3, the first inverter 4, and the second inverter 6 are connected by a DC harness 8, via a junction box 9.

The multistage gear transmission 1 is a normally meshing transmission comprising a plurality of gear pairs having different transmission ratios, and comprises six gear shafts 11-16 provided with gears and disposed parallel to each other inside the transmission case 10, and three engagement clutches C1, C2, and C3 for selecting a gear pair. A first shaft 11, a second shaft 12, a third shaft 13, a fourth shaft 14, a fifth shaft 15, and a sixth shaft 16 are provided as gear shafts. A first engagement clutch C1, a second engagement clutch C2, and a third engagement clutch C3 are provided as engagement clutches. The transmission case 10 is provided with an electric oil pump 20 that supplies lubrication oil to the meshing portions of the gears and the axle bearing portions inside the case.

The first shaft 11 is a shaft to which the internal combustion engine ICE is connected, and a first gear 101, a second gear 102, and a third gear 103 are disposed on the first shaft 11, in order from the right side in FIG. 1. The first gear 101 is integrally provided (including integral fixing) on the first shaft 11. The second gear 102 and the third gear 103 are idling gears, in which boss portions protruding in the axial direction are inserted onto the outer perimeter of the first shaft 11, and are provided so as to be drivably connectable to the first shaft 11 via the second engagement clutch C2.

The second shaft 12 is connected to the first motor/generator MG1, and is a cylindrical shaft coaxially disposed with the axis aligned with the outer side position of the first shaft 11, and a fourth gear 104 and a fifth gear 105 are disposed on the second shaft 12, in order from the right side in FIG. 1. The fourth gear 104 and the fifth gear 105 are integrally provided (including integral fixing) on the second shaft 12.

The third shaft 13 is a shaft disposed on the output side of the multistage gear transmission 1, with a sixth gear 106, a seventh gear 107, an eighth gear 108, a ninth gear 109, and a tenth gear 110 disposed on the third shaft 13, in order from the right side in FIG. 1. The sixth gear 106, the seventh gear 107, and the eighth gear 108 are integrally provided (including integral fixing) to the third shaft 13. The ninth gear 109 and the tenth gear 110 are idling gears, in which boss portions protruding in the axial direction are inserted onto the outer perimeter of the third shaft 13, and are provided so as to be drivably connectable to the third shaft 13 via the third engagement clutch C3. Then, the sixth gear 106 meshes with the second gear 102 of the first shaft 11, the seventh gear 107 meshes with a sixteenth gear 116 of a differential gear 17, and the eighth gear 108 meshes with the third gear 103 of the first shaft 11. The ninth gear 109 meshes with the fourth gear 104 of the second shaft 12, and the tenth gear 110 meshes with the fifth gear 105 of the second shaft 12.

The fourth shaft 14 has both ends supported on the transmission case 10, with an eleventh gear 111, a twelfth gear 112, and a thirteenth gear 113 disposed on the fourth shaft 14, in order from the right side in FIG. 1. The eleventh gear 111 is integrally provided (including integral fixing) on the fourth shaft 14. The twelfth gear 112 and the thirteenth gear 113 are idling gears, in which boss portions protruding in the axial direction are inserted onto the outer perimeter of the fourth shaft 14, and are provided so as to be drivably connectable to the fourth shaft 14 via the first engagement clutch C1. Then, the eleventh gear 111 meshes with the first gear 101 of the first shaft 11, the twelfth gear 112 meshes with a second gear 102 of the first shaft 11, and the thirteenth gear 113 meshes with the fourth gear 104 of the second shaft 12. The fifth shaft 15 has both ends supported on the transmission case 10, and a fourteenth gear 114 that meshes with the eleventh gear 111 of the fourth shaft 14 is integrally provided thereto (including integral fixing). The sixth shaft 16 is connected to the second motor/generator MG2, and a fifteenth gear 115 that meshes with the fourteenth gear 114 of the fifth shaft 15 is integrally provided thereto (including integral fixing). Then, the second motor/generator MG2 and the internal combustion engine ICE are mechanically connected to each other by a gear train configured from the fifteenth gear 115, the fourteenth gear 114, the eleventh gear 111, and the first gear 101, which mesh with each other. This gear train serves as a reduction gear train that decelerates the MG2 rotation speed at the time of an MG2 start of the internal combustion engine ICE by the second motor/generator MG2, and serves as a speed increasing gear train that accelerates the engine rotation speed at the time of MG2 power generation for generating the second motor/generator MG2, by the driving of the internal combustion engine ICE.

The first engagement clutch C1 is a dog clutch interposed between the twelfth gear 112 and the thirteenth gear 113 of the fourth shaft 14, and is engaged by an engagement movement in a rotation synchronization state, by not having a synchronizing mechanism. When the first engagement clutch C1 is in a left engagement position (Left), the fourth shaft 14 and the thirteenth gear 113 are drivably connected. When the first engagement clutch C1 is in a neutral position (N), the fourth shaft 14 and the twelfth gear 112 are released, and the fourth shaft 14 and the thirteenth gear 113 are released. When the first engagement clutch C1 is in a right engagement position (Right), the fourth shaft 14 and the twelfth gear 112 are drivably connected.

The second engagement clutch C2 is a dog clutch interposed between the second gear 102 and the third gear 103 of the first shaft 11, and is engaged by an engagement movement in a rotation synchronization state, by not having a synchronizing mechanism. When the second engagement clutch C2 is in a left engagement position (Left), the first shaft 11 and the third gear 103 are drivably connected. When the second engagement clutch C2 is in a neutral position (N), the first shaft 11 and the second gear 102 are released, and the first shaft 11 and the third gear 103 are released. When the second engagement clutch C2 is in a right engagement position (Right), the first shaft 11 and the second gear 102 are drivably connected.

The third engagement clutch C3 is a dog clutch interposed between the ninth gear 109 and the tenth gear 110 of the third shaft 13, and is engaged by an engagement movement in a rotation synchronization state, by not having a synchronizing mechanism. When the third engagement clutch C3 is in a left engagement position (Left), the third shaft 13 and the tenth gear 110 are drivably connected. When the third engagement clutch C3 is in a neutral position (N), the third shaft 13 and the ninth gear 109 are released, and the third shaft 13 and the tenth gear 110 are released. When the third engagement clutch C3 is in a right engagement position (Right), the third shaft 13 and the ninth gear 109 are drivably connected. Then, a sixteenth gear 116 that meshes with the seventh gear 107 integrally provided (including integral fixing) to the third shaft 13 of the multistage gear transmission 1 is connected to left and right drive wheels 19 via the differential gear 17 and left and right drive shafts 18.

The control system of the hybrid vehicle comprises a hybrid control module 21, a motor control unit 22, a transmission control unit 23, and an engine control unit 24, as illustrated in FIG. 1.

The hybrid control module 21 (abbreviation: "HCM") is an integrated control means to appropriately manage the energy consumption of the entire vehicle. This hybrid control module 21 is connected to the other control units (motor control unit 22, transmission control unit 23, engine control unit 24, etc.) so as to be capable of bidirectional information exchange by a CAN communication line 25. The "CAN" in CAN communication line 25 is an abbreviation for "Controller Area Network."

The motor control unit 22 (abbreviation: "MCU") carries out powering control, regeneration control, and the like, of the first motor/generator MG1 and the second motor/generator MG2, by control commands to the first inverter 4 and the second inverter 6. The control modes for the first motor/generator MG1 and the second motor/generator MG2 are "torque control" and "rotational speed FB control." In the "torque control," a control is carried out in which the actual motor torque is caused to follow a target motor torque, when a target motor torque to be shared with respect to a target drive force is determined. In the "rotational speed FB control," a control is carried out in which a target motor rotation speed, with which the input/output rotational speeds of the clutch are synchronized, is determined, and an FB torque is output so as to converge the actual motor rotation speed to the target motor rotation speed, when there is a gear shift request to mesh and engage any one of the engagement clutches C1, C2, or C3 during traveling.

The transmission control unit 23 (abbreviation: "TMCU") carries out a shift control for switching the gear shift pattern of the multistage gear transmission 1, by outputting a current command to electric actuators 31, 32, or 33 (refer to FIG. 2), based on predetermined input information. In this shift control, the engagement clutches C1, C2, or C3 are selectively mesh engaged/released, and a gear pair involved in power transmission is selected from the plurality of pairs of gear pairs. Here, at the time of a gear shift request to engage any one of the released engagement clutches C1, C2, or C3, in order to suppress differential rotation speed between the input/output of the clutch to ensure meshing engagement, a rotational speed FB control (rotation synchronization control) of the first motor/generator MG1 or the second motor/generator MG2 is used in combination.

The engine control unit 24 (abbreviation: "ECU") carries out start control of the internal combustion engine ICE, stop control of the internal combustion engine ICE, fuel cut control, and the like, by outputting a control command to the motor control unit 22, a spark plug, a fuel injection actuator, or the like, based on predetermined input information.

Configuration of the Shift Control System

The multistage gear transmission 1 according to the first embodiment is characterized in that efficiency is achieved by reducing drag by employing, as shifting elements, engagement clutches C1, C2, and C3 (dog clutch) that are meshingly engaged. Then, when there is a gear shift request to mesh and engage any one of the engagement clutches C1, C2, or C3, the differential rotation speeds of the input/output of the clutch are synchronized by the first motor/generator MG1 or the second motor/generator MG2, and an engagement stroke is started once the rotational speed falls within a synchronization determination rotational speed range, to realize the gear shift. In addition, when there is a gear shift request to release any one of the engaged engagement clutches C1, C2, or C3, the clutch transmission torque of the release clutch is reduced, and a disengagement stroke is started once the torque becomes equal to or less than a release torque determination value, to realize the gear shift. The configuration of the shift control system of the multistage gear transmission 1 is described below based on FIG. 2.

Figure 2:
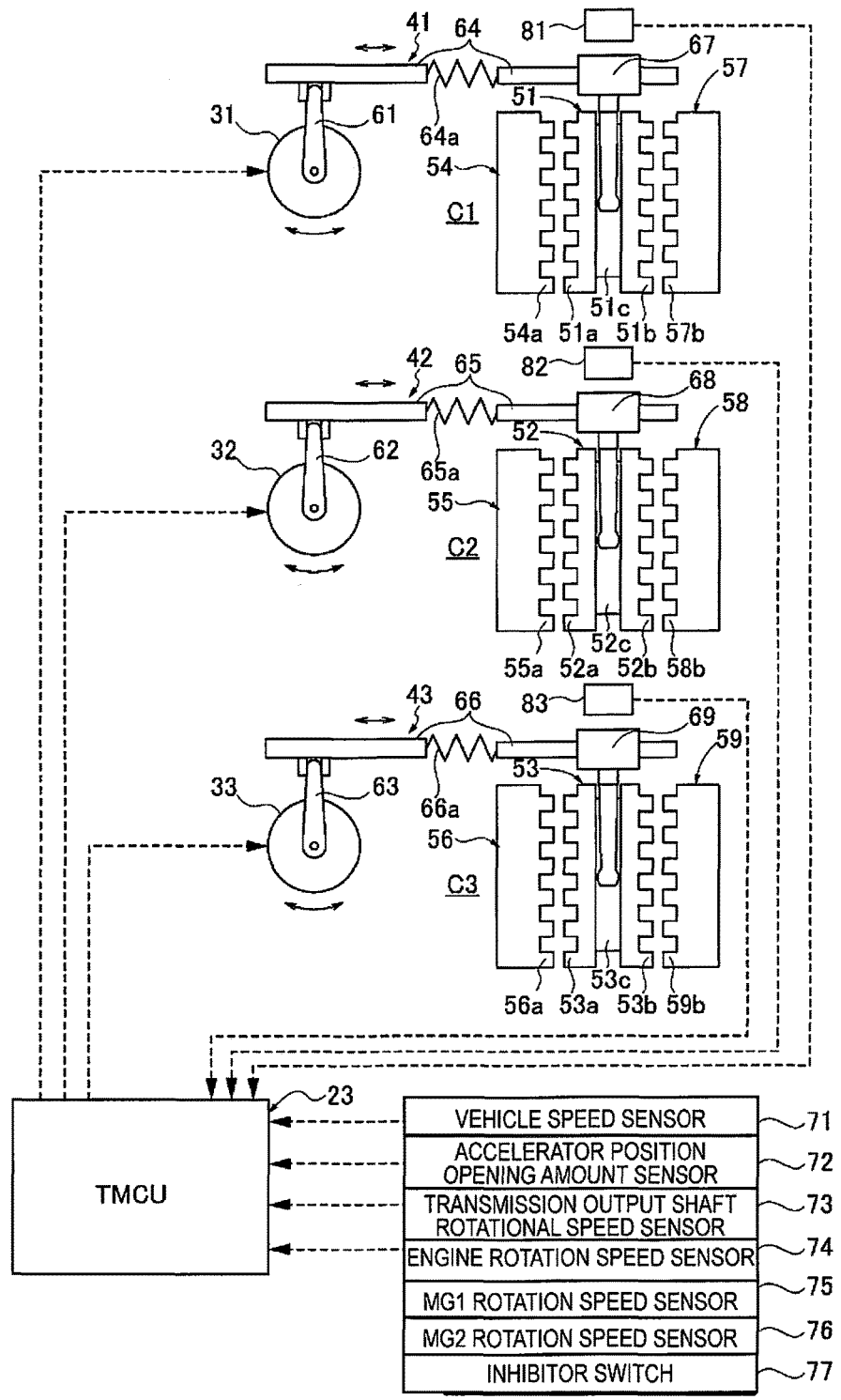
FIG. 2 is a control system block diagram illustrating the configuration of a shift control system of a multistage gear transmission mounted on a hybrid vehicle to which is applied the transmission control device of the first embodiment.

The shift control system comprises, as engagement clutches, a first engagement clutch C1, a second engagement clutch C2, and a third engagement clutch C3, as illustrated in FIG. 2. A first electric actuator 31, a second electric actuator 32, and a third electric actuator 33 are provided. A first engagement clutch operating mechanism 41, a second engagement clutch operating mechanism 42, and a third engagement clutch operating mechanism 43 are provided as mechanisms that convert actuator operations into clutch engagement/disengagement operations. Furthermore, a transmission control unit 23 is provided as a control means of the first electric actuator 31, the second electric actuator 32, and the third electric actuator 33.

The first engagement clutch C1, the second engagement clutch C2, and the third engagement clutch C3 are dog clutches that switch between a neutral position (N: disengaged position), a left engagement position (Left: left side clutch meshing engagement position), and a right engagement position (Right: right side clutch meshing engagement position). The engagement clutches C1, C2, and C3 all have the same configuration, comprising coupling sleeves 51, 52, and 53; left dog clutch rings 54, 55, and 56; and right dog clutch rings 57, 58, and 59. The coupling sleeves 51, 52, and 53 are provided so as to be movable in the axial direction by a spline connection via a hub, which is not shown, fixed to the fourth shaft 14, the first shaft 11, and the third shaft 13, and have dog teeth 51a, 51b; 52a, 52b; and 53a, 53b on both sides having flat top faces. Furthermore, fork grooves 51c, 52c, and 53c are provided in the circumferential center portions of the coupling sleeves 51, 52, and 53. The left dog clutch rings 54, 55, and 56 are fixed to the boss portions of the gears 113, 103, and 110, which are left idling gears of the engagement clutches C1, C2, and C3, and have dog teeth 54a, 55a, and 56a with flat top faces that oppose the dog teeth 51a, 52a, and 53a. The right dog clutch rings 57, 58, and 59 are fixed to the boss portions of the gears 112, 102, and 109, which are right idling gears of the engagement clutches C1, C2, and C3, and have dog teeth 57b, 58b, and 59b with flat top faces that oppose the dog teeth 51b, 52b, and 53b.

The first engagement clutch operating mechanism 41, the second engagement clutch operating mechanism 42, and the third engagement clutch operating mechanism 43 convert the turning motions of the electric actuators 31, 32, and 33 into axial movement of the coupling sleeves 51, 52, and 53. The engagement clutch operating mechanisms 41, 42, and 43 all have the same configuration, comprising turning links 61, 62, and 63; shift rods 64, 65, and 66; and shift forks 67, 68, and 69. One end of each of the turning links 61, 62, and 63 is provided on the actuator shafts of the electric actuators 31, 32, and 33, with the other end connected to one of the shift rods 64, 65, and 66 so as to be relatively displaceable. The shift rods 64, 65, and 66 are capable of expanding and contracting according to the magnitude and the direction of the rod transmitting force, by having springs 64a, 65a, and 66a interposed in the rod dividing positions. One end of each of the shift forks 67, 68, and 69 is fixed to one of the shift rods 64, 65, or 66, and the other end is disposed in one of the fork grooves 51c, 52c, or 53c of the coupling sleeves 51, 52, and 53.

The transmission control unit 23 inputs sensor signals and switch signals from a vehicle speed sensor 71, an accelerator position opening amount sensor 72, a transmission output shaft rotational speed sensor 73, an engine rotation speed sensor 74, an MG1 rotation speed sensor 75, an MG2 rotation speed sensor 76, an inhibitor switch 77, and the like. The transmission output shaft rotational speed sensor 73 is provided on the third shaft 13. Then, a position servo control unit (for example a position servo system by PID control) is provided, which controls mesh engagement and disengagement of the engagement clutches C1, C2, and C3, determined by the positions of the coupling sleeves 51, 52, and 53. This position servo control unit inputs sensor signals from a first sleeve position sensor 81, a second sleeve position sensor 82, and a third sleeve position sensor 83. Then, the sensor values of the sleeve position sensors 81, 82, and 83 are read, and a current is imparted to the electric actuators 31, 32, and 33 such that the positions of the coupling sleeves 51, 52, and 53 will be in the disengaged position or the engagement position according to an engagement stroke. That is, by setting an engaged state in which the dog teeth on the coupling sleeves 51, 52, and 53, and the dog teeth on the idling gears are both in engagement positions engagement with each other, the idling gears are drivingly connected to the fourth shaft 14, the first shaft 11, and the third shaft 13. On the other hand, by setting a disengaged state, in which the dog teeth on the coupling sleeves 51, 52, and 53, and the dog teeth on the idling gears are in non-engagement positions by displacing the coupling sleeves 51, 52, and 53 in the axial direction, the idling gears are disconnected from the fourth shaft 14, the first shaft 11, and the third shaft 13.

Configuration of the Gear Shift Pattern

The multistage gear transmission 1 of the first embodiment is characterized in that size reduction is achieved by reducing the power transmission loss by not having a differential rotation absorbing element, such as a fluid coupling, and by reducing the gear shift stages of the ICE by providing motor assistance to the internal combustion engine ICE (EV gear shift stages: 1-2 speed, ICE gear shift stages: 1-4 speed). The configuration of the gear shift pattern of the multistage gear transmission 1 is described below based on FIG. 3 and FIG. 4.

Figure 3:
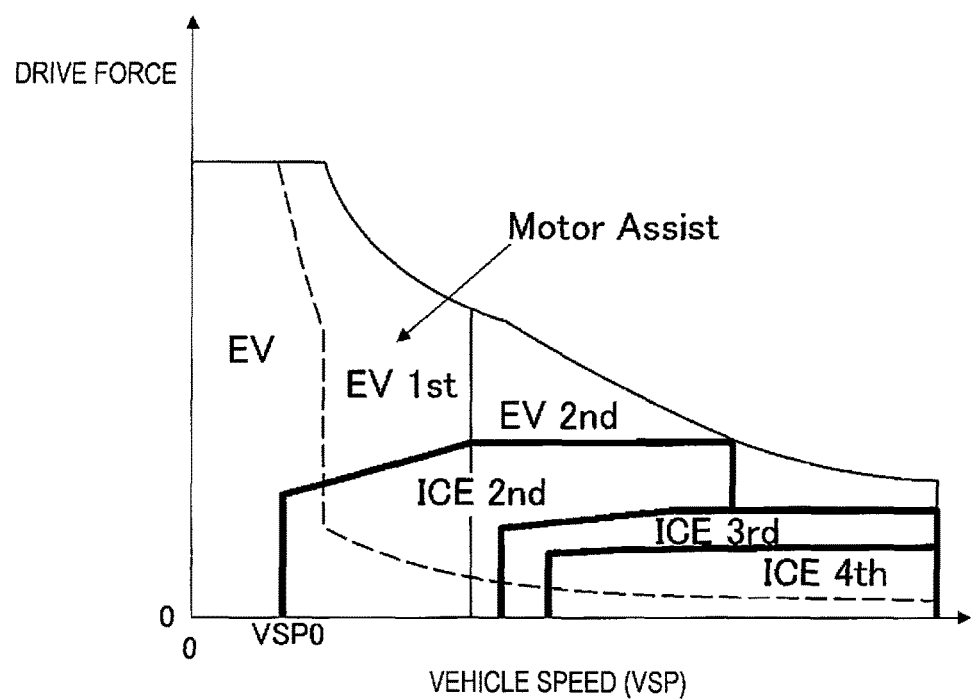
FIG. 3 is a schematic overview of a shifting map illustrating a concept of switching the gear shift pattern in a multistage gear transmission mounted on a hybrid vehicle to which is applied the transmission control device of the first embodiment.

A concept of a gear shift pattern is employed in which, when the vehicle speed VSP is in a starting region equal to, or less than, a predetermined vehicle speed VSP0, since the multistage gear transmission 1 does not have a differential rotation absorbing element, a motor start by only the motor driving force is carried out in the "EV mode," as illustrated in FIG. 3. Then, when in the traveling region and the demand for driving force is great, a "parallel HEV mode" is employed in which the engine driving force is assisted by the motor driving force, as illustrated in FIG. 3. That is, as the vehicle speed VSP increases, the ICE gear shift stages shift from (ICE 1st→) ICE 2nd→ICE 3rd→ICE 4th, and the EV gear shift stages shift from EV 1st→EV 2nd. Therefore, based on the concept of the gear shift pattern illustrated in FIG. 3, a shifting map for issuing gear shift requests for switching the gear shift pattern is created.

The gear shift patterns obtainable by the multistage gear transmission 1 having engagement clutches C1, C2, and C3 are as shown in FIG. 4. In FIG. 4, "Lock" represents an interlock pattern that is not applicable as a gear shift pattern, "EV-" represents a state in which the first motor/generator MG1 is not drivingly connected to the driving wheels 19, and "ICE-" represents a state in which the internal combustion engine ICE is not drivingly connected to the driving wheels 19. In the shift control, it is not necessary to use all the gear shift patterns shown in FIG. 4, and it is, of course, possible to select from these gear shift patterns according to need. Each of the gear shift patterns is described below.

When the second engagement clutch C2 is "N" and the third engagement clutch C3 is "N," the following gear shift patterns are obtained according to the position of the first engagement clutch C1. "EV-ICEgen" is obtained if the first engagement clutch C1 is "Left," "Neutral" is obtained if the first engagement clutch C1 is "N," and "EV-ICE 3rd" is obtained if the first engagement clutch C1 is "Right." Here, the gear shift pattern "EV-ICEgen" is a pattern selected at the time of MG1 idle power generation, in which power is generated in the first motor/generator MG1 by the internal combustion engine ICE when the vehicle is stopped, or at the time of double idle power generation in which MG2 power generation is carried out in addition to MG1 power generation. The gear shift pattern "Neutral" is a pattern selected at the time of MG2 idle power generation, in which power is generated in the second motor/generator MG2 by the internal combustion engine ICE when the vehicle is stopped.

When the second engagement clutch C2 is "N" and the third engagement clutch C3 is "Left," the following gear shift patterns are obtained according to the position of the first engagement clutch C1. "EV 1st ICE 1st" is obtained if the first engagement clutch C1 is "Left," "EV 1st ICE-" is obtained if the first engagement clutch C1 is "N," and "EV 1st ICE 3rd" is obtained if the first engagement clutch C1 is "Right." Here, the gear shift pattern "EV 1st ICE-" is an "EV mode" pattern in which the internal combustion engine ICE is stopped and traveling is carried out by the first motor/generator MG1, or a "series HEV mode" pattern in which a first-speed EV traveling is carried out by the first motor/generator MG1 while power is generated in the second motor/generator MG2 by the internal combustion engine ICE. Therefore, for example when traveling while selecting the "series HEV mode" by "EV 1st ICE-," the first engagement clutch C1 is switched from "N" to "Left," based on deceleration due to insufficient driving force. In this case, the vehicle is transitioned to traveling by a "parallel HEV mode (first speed)" according to the "EV 1st ICE 1st" gear shift pattern, in which the driving force is secured.

When the second engagement clutch C2 is "Left" and the third engagement clutch C3 is "Left," "EV 1st ICE 2nd" is obtained if the position of the first engagement clutch C1 is "N." Therefore, for example, if the driving force requirement is increased during first-speed EV traveling while selecting the "series HEV mode" by "EV 1st ICE-," the second engagement clutch C2 is switched from "N" to "Left." In this case, the vehicle is transitioned to traveling by a "parallel HEV mode" according to the "EV 1st ICE 2nd" gear shift pattern, in which the driving force is secured.

When the second engagement clutch C2 is "Left" and the third engagement clutch C3 is "N," the following gear shift patterns are obtained according to the position of the first engagement clutch C1. "EV 1.5 ICE 2nd" is obtained if the first engagement clutch C1 is "Left," and "EV-ICE 2nd" is obtained if the first engagement clutch C1 is "N."

When the second engagement clutch C2 is "Left" and the third engagement clutch C3 is "Right," "EV 2nd ICE 2nd" is obtained if the position of the first engagement clutch C1 is "N." Therefore, for example when traveling in the "parallel HEV mode" while selecting the "EV 1st ICE 2nd" gear shift pattern, the third engagement clutch C3 is switched from "Left" to "Right" via "N," according to an up-shift request. In this case, the vehicle is transitioned to traveling by the "parallel HEV mode" according to the "EV 2nd ICE 2nd" gear shift pattern, in which the EV gear shift stage is set to second speed. For example when traveling in the "parallel HEV mode" while selecting the "EV 2nd ICE 4th" gear shift pattern, the second engagement clutch C2 is switched from "Right" to "Left" via "N," according to a downshift request. In this case, the vehicle is transitioned to traveling by the "parallel HEV mode" according to the "EV2nd ICE 2nd" gear shift pattern, in which the ICE gear shift stage is set to second speed.

When the second engagement clutch C2 is "N" and the third engagement clutch C3 is "Right," the following gear shift patterns are obtained according to the position of the first engagement clutch C1. "EV 2nd ICE 3rd" is obtained if the first engagement clutch C1 is "Left," "EV 2nd ICE-" is obtained if the first engagement clutch C1 is "N," and "EV 2nd ICE 3rd" is obtained if the first engagement clutch C1 is "Right." Here, the gear shift pattern "EV 2nd ICE-" is an "EV mode" pattern in which the internal combustion engine ICE is stopped and traveling is carried out by the first motor/generator MG1, or, a "series HEV mode" pattern in which a second-speed EV traveling is carried out by the first motor/generator MG1 while power is generated in the second motor/generator MG2 by the internal combustion engine ICE. Therefore, for example when traveling in the "parallel HEV mode" while selecting the "EV 2nd ICE 2nd" gear shift pattern, the second engagement clutch C2 is switched from "Right" to "N" and the first engagement clutch C1 is switched from "N" to "Right," according to an up-shift request. In this case, the vehicle is transitioned to traveling by the "parallel HEV mode" according to the "EV 2nd ICE 3rd" gear shift pattern, in which the ICE gear shift stage is set to third speed.

When the second engagement clutch C2 is "Right" and the third engagement clutch C3 is "Right," "EV 2nd ICE 4th" is obtained if the position of the first engagement clutch C1 is "N."

When the second engagement clutch C2 is "Right" and the third engagement clutch C3 is "N," the following gear shift patterns are obtained according to the position of the first engagement clutch C1. "EV 2.5 ICE 4th" is obtained if the first engagement clutch C1 is "Left," and "EV-ICE 4th" is obtained if the first engagement clutch C1 is "N."

When the second engagement clutch C2 is "Right" and the third engagement clutch C3 is "Left," "EV 1st ICE 4th" is obtained if the position of the first engagement clutch C1 is "N."

Configuration of the Shift Control Process

Figure 5:
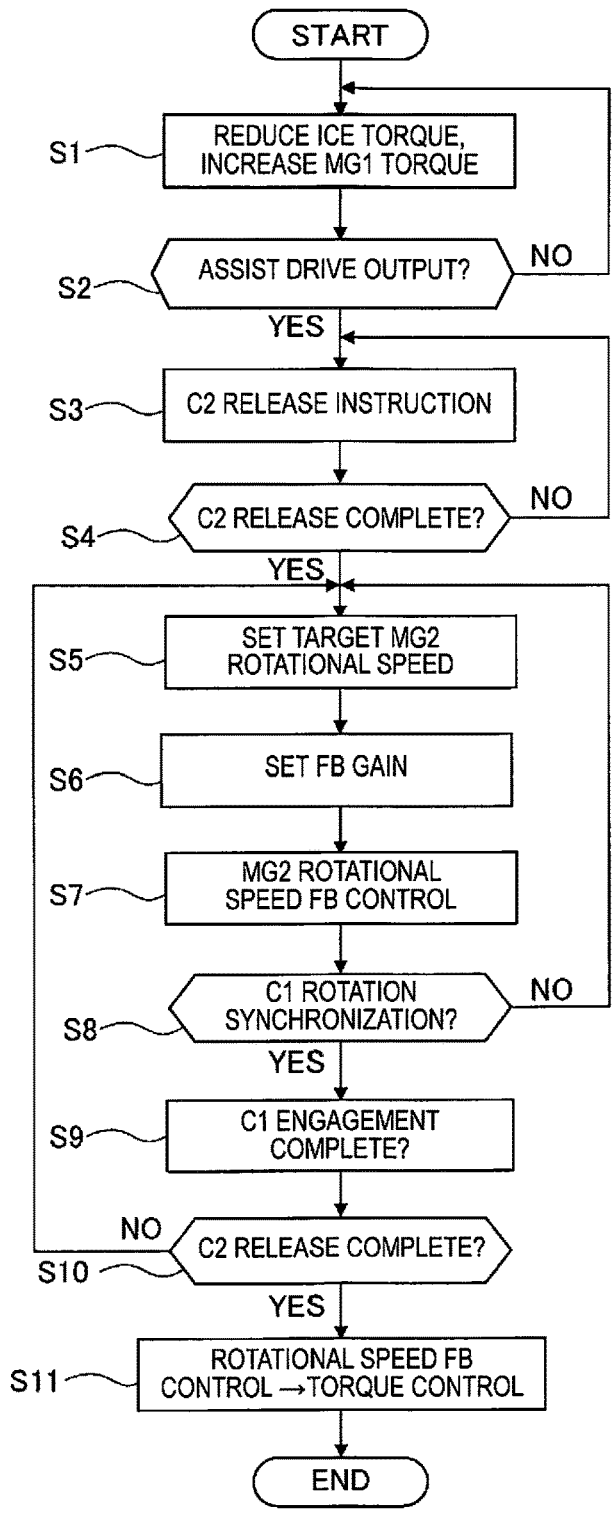
FIG. 5 is a flowchart illustrating the flow of a shift control process carried out in a transmission control unit of the first embodiment.

FIG. 5 illustrates the flow of a shift control process carried out in the transmission control unit 23 (transmission controller) of the first embodiment. Each of the steps in FIG. 5, which shows one example of the configuration of the shift control process, will be described below. This shift control process is started based on a switching request of the gear shift pattern from "EV 2nd ICE 2nd" to "EV 2nd ICE 3rd," and a substitution gear change, in which the second engagement clutch C2 is released and the first engagement clutch C1 is engaged, is carried out.

In Step S1, when there is a switching request of the gear shift pattern, or when it is determined in Step S2 that an assist drive output is absent, a torque reduction instruction to the internal combustion engine ICE, as well as a torque increase instruction to the first motor/generator MG1 are output, and the process proceeds to Step S2. Here, the torque reduction instruction to the internal combustion engine ICE is output until the ICE torque becomes zero, and zero torque is maintained until an engagement of the first engagement clutch C1 is completed. The torque increase instruction to the first motor/generator MG1 is output to MG1 torque, which compensates the driving force by assisting the decreasing ICE torque, and a high compensation torque is maintained until the engagement of the first engagement clutch C1 is completed.

In Step S2, following the output of ICE torque reduction and MG1 torque increase instructions, it is determined whether or not an assist drive output it present due to the MG1 torque increase instruction to the first motor/generator MG1. In the case of YES (assist drive output present), the process proceeds to Step S3, and if NO (assist drive output absent), the process returns to Step S1. Here, the presence/absence of an assist drive output is determined by time management by a timer, and the timer period is set to a predetermined time from a dog clutch release command time t1 (FIG. 10) until the dog clutch enters a disengaged state. The specific predetermined time is the time from when a disengagement operation is actually started after a dog clutch disengagement command, until, in parallel thereto, torque down→the spring is extended and a disengagement force is applied→a state in which the torque is reduced and the engagement is released is reached, and the timer period is determined by, for example, a large number of experimental data.

In Step S3, following the determination that an assist drive output is present in Step S2, or following a determination that disengagement of the second engagement clutch C2 is incomplete in Step S4, a release instruction is output to the second engagement clutch C2, and the process proceeds to Step S4. Here, a release instruction to the second engagement clutch C2 is an instruction in which the command position of the second engagement clutch C2 is caused to move from an engagement position to a disengaged position. That is, the position of the coupling sleeve 52 of the second engagement clutch C2 is changed from the engagement position until reaching the disengaged position, by a position servo control unit that imparts electric current to the second electric actuator 32.

In Step S4, following the output of a C2 disengagement instruction in Step S3, it is determined whether or not the disengagement of the second engagement clutch C2 is complete. In the case of YES (C2 disengagement complete), the process proceeds to Step S5, and if NO (C2 disengagement incomplete), the process returns to Step S3. Here, a disengagement of the second engagement clutch C2 is determined to be complete when a sleeve position signal from the second sleeve position sensor 82 has reached the disengaged position.

In Step S5, following the determination that C2 disengagement is incomplete in Step S4, or, a determination that C1 rotation is asynchronous in Step S8, or a determination that C1 engagement is incomplete in Step S10, a target MG2 rotational speed is set, and the process proceeds to Step S6. Here, a "target MG2 rotational speed" refers to a target motor rotation speed of the second motor/generator MG2 for putting the first engagement clutch C1, which is disengaged in the gear shift pattern before shifting and is engaged in the gear shift pattern after shifting, to a rotation synchronization state. That is, the "target MG2 rotational speed" is a motor rotation speed that corresponds to a synchronization determination rotational speed for making the actual differential rotation speed of the first engagement clutch C1 to be the target differential rotation speed. The "synchronization determination rotational speed" is set, not to a zero rotation speed for determining a complete rotation synchronization, but rather, to a differential rotation speed that avoids tooth contact between the tooth top surfaces while achieving a smooth meshing engagement operation of the first engagement clutch C1. The target MG2 rotational speed ($\omega_T$) is set based on the following formula (1), using the transmission output shaft rotational speed ($\omega_O$) of the multistage gear transmission 1, and the gear ratio ($G_L$) from an MG2 rotational shaft to the transmission output shaft.

$$\omega_T = G_L \cdot \omega_O \tag{1}$$

The "gear ratio ($G_L$) from an MG2 rotational shaft to the transmission output shaft" in formula (1) is the total gear ratio from the MG2 rotational shaft (=sixth shaft 16) to the transmission output shaft (=third shaft 13), when the first engagement clutch C1 is in the "Right" position and it becomes "EV 2nd ICE 3rd." That is, the gear ratio be according to a route from the sixth shaft 16 (=MG2 rotational shaft)→fifteenth gear 115→fourteenth gear 114→fourth shaft 14→first clutch C1→twelfth gear 112→second gear 102→sixth gear 106→third shaft 13 (=transmission output shaft). In addition, the "transmission output shaft rotational speed (coo)" in formula (1) is the output value of the transmission output shaft rotational speed sensor 73 provided to an end position of the third shaft 13. That is, the "target MG2 rotational speed" for putting the first engagement clutch C1 to be engaged into a rotation synchronization state is obtained by conversion using the transmission output shaft rotational speed (coo), which is a value that does not change before and after shifting (=vehicle speed equivalent value) and the gear ratio ($G_L$) after shifting assuming C1 engagement (=rotation synchronization). The disengagement of the first engagement clutch C1, which is engaged after shifting, is determined by a sleeve position sensor value from the first sleeve position sensor 81 being in the disengaged position.

In Step S6, following setting of the target MG2 rotational speed in Step S5, a proportional element FB gain Kp and an integral element FB gain Ki to be used when carrying out rotational speed FB control on the second motor/generator MG2 are set, and the process proceeds to Step S7. Here, when setting the FB gains Kp, Ki, an absolute value of the differential rotation speed $|\varepsilon|=|(\omega_R)-(\omega_T)|$ between the actual motor rotation speed $(\omega_R)$ of the second motor/generator MG2 and the target MG2 rotational speed $(\omega_T)$ set in Step S5 is calculated. The actual motor rotation speed $(\omega_R)$ is the output value of the MG2 rotation speed sensor 76 provided to the second motor shaft (=sixth shaft 16) of the second motor/generator MG2. Then, the FB gains are determined by using the FB gain characteristics illustrated in FIG. 6 or FIG. 7. That is, in a region where the absolute value of the differential rotation speed $|\varepsilon|$ exceeds $|\varepsilon1|$, the FB gains Kp, Ki are set to a constant value in the rotational speed FB control stability limit. In the region where the absolute value of the differential rotation speed $|\varepsilon|$ is less than $|\varepsilon1|$, the FB gains Kp, Ki are reduced in proportion to the decrease of the absolute value of the differential rotation speed $|\varepsilon|$. However, when using the characteristics of FIG. 6, the FB gains Kp, Ki are also reduced to zero when the absolute value of the differential rotation speed $|\varepsilon|$ decreases to 0. On the other hand, when using the characteristics of FIG. 7, when the absolute value of the differential rotation speed $|\varepsilon|$ decreases to $|\varepsilon2|$, the small values of the FB gains Kp, Ki at the time of $|\varepsilon2|$ are maintained in the region between $|\varepsilon2|$ to $|\varepsilon|=0$. The actual motor rotation speed $(\omega_R)$ is detected by the MG2 rotation speed sensor 76.

In Step S7, following the setting of the FB gain in Step S6, rotational speed FB control on the second motor/generator MG2 is carried out, and the process proceeds to Step S8. Here, a rotational speed FB control on the second motor/generator MG2 is a control in which the actual motor rotation speed $(\omega_R)$ of the second motor/generator MG2 is converged to the target MG2 rotational speed $(\omega_T)$ set in Step S5. Furthermore, the actual motor torque $(\omega_R)$ is controlled to match the target motor rotation speed $(\omega_T)$ by setting the motor torque command value for the second motor/generator MG2 to the motor torque $(T_M)$ obtained by the following formula (2).

$$T_M = \{(Kps-Ki)/s\} \times (\omega_T - \omega_R) \quad (2)$$

The "s" in the above-described formula (2) is a differentiation operator. When carrying out rotational speed FB control on the second motor/generator MG2, the values set in Step S6 are used for the FB gains Kp, Ki. Then, the motor torque (TM) calculated by formula (2) is the "FB torque."

In Step S8, following the MG2 rotational speed FB control in Step S7, it is determined whether or not rotation synchronization of the first engagement clutch C1 has been determined. In the case of YES (C1 rotation synchronization), the process proceeds to Step S9, and if NO (C1 asynchronous rotation), the process returns to Step S3. Here, the C1 rotation synchronization is determined based on whether or not a state in which the absolute value of the differential rotation speed $|\varepsilon|$ is smaller than a synchronization determination rotational speed, which is a determination threshold, has been maintained for a predetermined period of time.

In Step S9, following the determination of C1 rotation synchronization in Step S8, an engagement instruction is output to the first engagement clutch C1, and the process proceeds to Step S10. Here, an engagement instruction to the first engagement clutch C1 is an instruction in which the command position of the first engagement clutch C1 is caused to stroke from the disengaged position to the engagement position. That is, the position of the coupling sleeve 51 of the first engagement clutch C1 is changed from the disengaged position until reaching the engagement position, by a position servo control unit that imparts electric current to the first electric actuator 31.

In Step S10, following the C1 engagement instruction in Step S9, it is determined whether or not the engagement of the first engagement clutch C1 by meshing engagement are complete. In the case of YES (C1 engagement complete), the process proceeds to Step S11, and if NO (C1 engagement incomplete), the process returns to Step S5. Here, an engagement of the first engagement clutch C1 is determined to be complete when a sleeve position signal from the first sleeve position sensor 84 has reached the engagement position.

In Step S11, following the determination that C1 engagement is complete in Step S10, rotational speed FB control on the second motor/generator MG2 is stopped, the control is transitioned to torque control, and the process proceeds to End. Here, as the synchronous engagement of the first clutch C1 is completed, the control mode of the second motor/generator MG2 is returned from the rotational speed FB control to the original torque control by the MG2 torque. Then, the ICE torque of the internal combustion engine ICE is increased from zero torque and the MG1 torque of the first motor/generator MG1 is reduced from the driving force guaranteeing torque, so that the total torque of the ICE torque and the MG1 torque matches the required driving force.

Next, the actions are described. The "action of the shift control process," the "action of the shift control," and the "characteristic action of the shift control" will be separately described, regarding the actions of the transmission control device of a hybrid vehicle according to the first embodiment.

Action of the Shift Control Process

The action of the shift control process when switching the gear shift pattern from "EV 2nd ICE 2nd" to "EV 2nd ICE 3rd" will be described below, based on the flowchart shown in FIG. 5.

When there is a switching request from the "EV 2nd ICE 2nd" gear shift pattern to the "EV 2nd ICE 3rd" gear shift pattern, the process proceeds from Step S1→Step S2 in the flowchart of FIG. 5. While it is being determined that an assist drive output is absent in this Step S2, the flow proceeding from Step S1→Step S2 is repeated, and in Step S1, a torque reduction instruction is output to the internal combustion engine ICE and a torque increase instruction is output to the first motor/generator MG1.

Then, when it is determined that an assist drive output is present in Step S2, the process proceeds from Step S2 to Step S3→Step S4. Then, while it is being determined that C2 disengagement is incomplete in Step S4, the flow that proceeds from Step S3→Step S4 is repeated, and in Step S3, a release instruction is output to the second engagement clutch C2.

Then, when it is determined that C2 disengagement is complete in Step S4, the control mode of the second motor/generator MG2 is switched from torque control to rotational speed FB control, and the process proceeds from Step S5→Step S6→Step S7→Step S8. While it is being determined that C1 rotation is asynchronous in Step S8, the flow proceeding from Step S5→Step S6→Step S7→Step S8 is repeated. In this flow, the target MG2 rotational speed is set in Step S5, the FB gains Kp, Ki are set in accordance with the absolute value of the differential rotation speed in Step S6, and the rotational speed FB control on the second motor/generator MG2 is carried out in Step S7.

Then, when C1 rotation synchronization is determined in Step S8, the process proceeds from Step S8 to Step S9→Step S10. While it is being determined that C1 engagement is incomplete in this Step S10, the flow that proceeds from Step S5→Step S6→Step S7→Step S8→Step S9→Step S10 is repeated, and in Step S9, an engagement instruction is output to the first engagement clutch C1. If it is determined that C1 rotation is asynchronous in Step S8, which is in the middle of this flow, the process proceeds from Step S5→Step S6→Step S7→Step S8. That is, until it is determined that the engagement of the first engagement clutch C1 is complete, rotational speed FB control on the second motor/generator MG2 is carried out in Step S7, based on the setting of the target MG2 rotational speed in Step S5 and the setting of the FB gains Kp, Ki according to the absolute value of the differential rotation speed in Step S6.

Then, when it is determined that C1 engagement is complete in Step S10, the process proceeds from Step S10 to Step S11, and in Step S11, the rotational speed FB control on the second motor/generator MG2 is stopped, and the control is transitioned to torque control.

Action of the Shift Control

Figure 8:
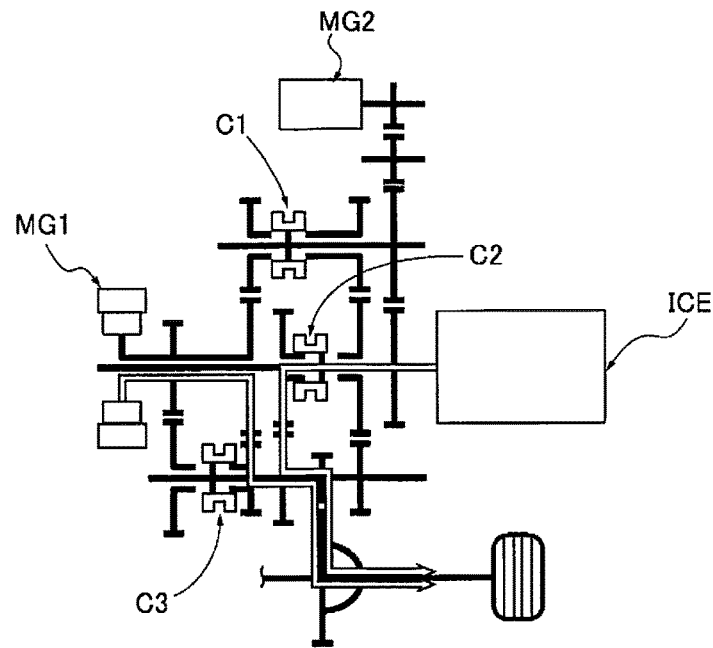
FIG. 8 is a torque flow diagram illustrating the flow of the MG1 torque and the ICE torque in a multistage gear transmission when the "EV 2nd ICE 2nd" gear shift pattern is selected.
Figure 9:
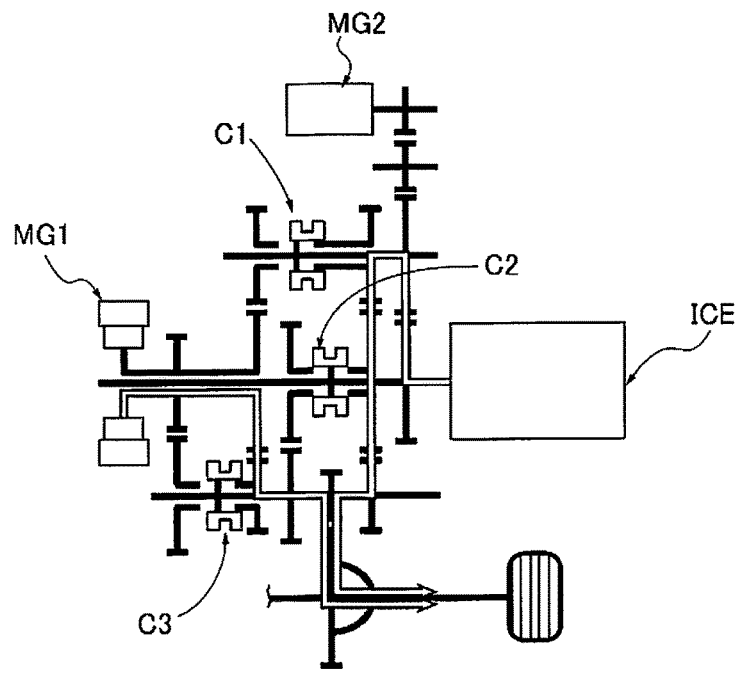
FIG. 9 is a torque flow diagram illustrating the flow of the MG1 torque and the ICE torque in a multistage gear transmission when the "EV 2nd ICE 3rd" gear shift pattern is selected.

The action of the shift control according to one example of a shift from the "EV 2nd ICE 2nd" gear shift pattern to the "EV 2nd ICE 3rd" gear shift pattern will be described below, based on FIGS. 8 to 10.

First, the flow of the MG1 torque and the ICE torque in the multistage gear transmission 1 when the "EV 2nd ICE 2nd" gear shift pattern is selected will be described based on FIG. 8. In the "EV 2nd ICE 2nd" gear shift pattern, the first engagement clutch C1 is in the "N" position, the second engagement clutch C2 is in the "Left" position, and the third engagement clutch C3 is in the "Right" position. Therefore, the MG1 torque flows from the first motor/generator MG1 to the second shaft 12→the fourth gear 104→the ninth gear 109→the third shaft 13→the seventh gear 107→the sixteenth gear 116→the differential gear 17→the drive shaft 18→the driving wheels 19. On the other hand, the ICE torque flows from the internal combustion engine ICE to the first shaft 11→the third gear 103→the eighth gear 108→the third shaft 13→the seventh gear 107→the sixteenth gear 116→the differential gear 17→the drive shaft 18→the driving wheels 19.

Next, the flow of the MG1 torque and the ICE torque in the multistage gear transmission 1 when the "EV 2nd ICE 3rd" gear shift pattern is selected will be described based on FIG. 9. In the "EV 2nd ICE 3rd" gear shift pattern, the first engagement clutch C1 is in the "Right" position, the second engagement clutch C2 is in the "N" position, and the third engagement clutch C3 is in the "Right" position. Therefore, the MG1 torque flows from the first motor/generator MG1 to the second shaft 12→the fourth gear 104→the ninth gear 109→the third shaft 13→the seventh gear 107→the sixteenth gear 116→the differential gear 17→the drive shaft 18→the driving wheels 19, in the same manner as FIG. 8. On the other hand, the ICE torque flows from the internal combustion engine ICE to the first shaft 11→the first gear 101→the eleventh gear 111→the fourth shaft 14→the twelfth gear 112→the second gear 102→the sixth gear 106→the third shaft 13→the seventh gear 107. Furthermore, the ICE torque flow from the seventh gear 107 to the sixteenth gear 116→the differential gear 17→the drive shaft 18→the drive wheels 19.

As described above, switching the gear shift pattern from "EV 2nd ICE 2nd" to "EV 2nd ICE 3rd" is achieved by releasing the second engagement clutch C2 from the "Left" position to the "N" position, and engaging the first engagement clutch C1 from the "N" position to the "Right" position. The switching action of the gear shift pattern from "EV 2nd ICE 2nd" to "EV 2nd ICE 3rd" will be described below based on FIG. 10.

Figure 10:
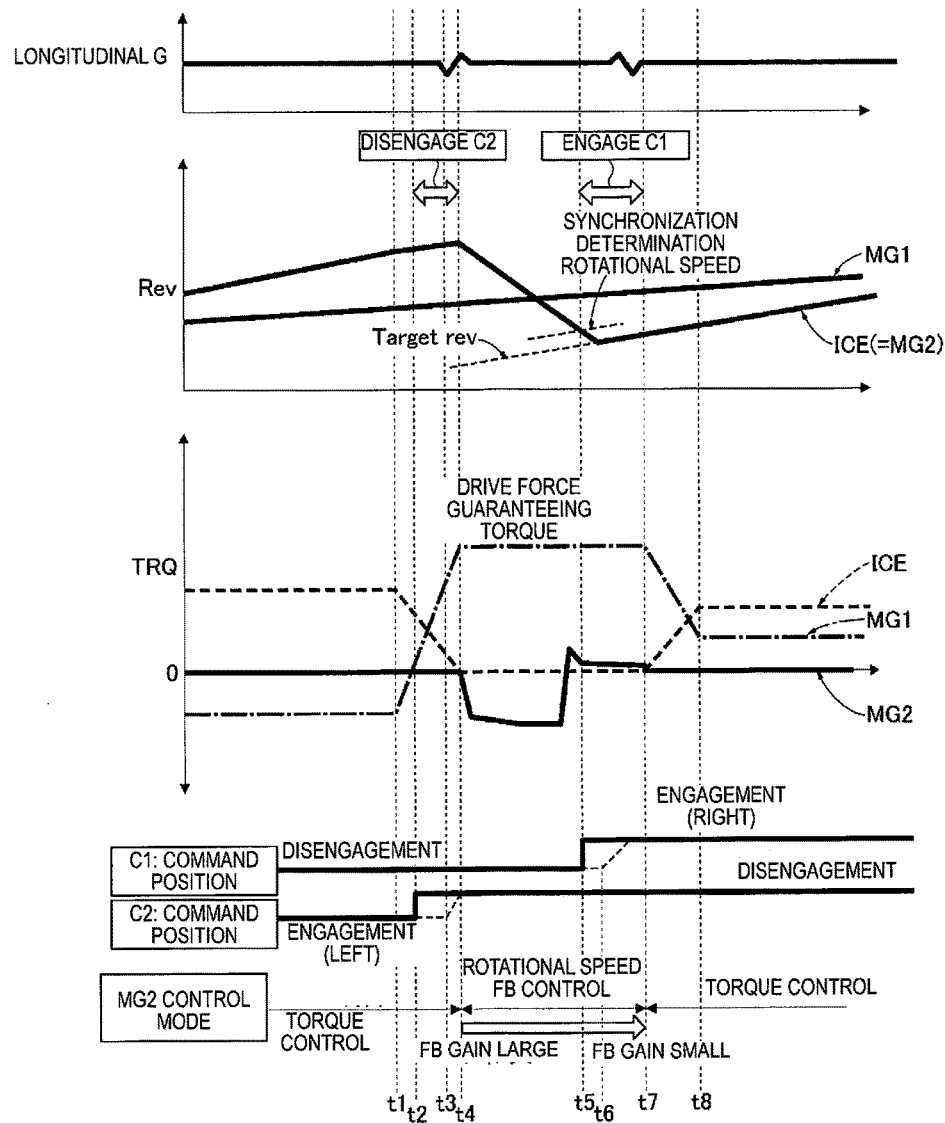
FIG. 10 is a time chart illustrating each of the characteristics of the longitudinal G/MG1 rotation speed/engine rotation speed (=MG2 rotation speed)/MG1 torque/engine torque/MG2 torque/C1 command position/C2 command position/MG2 control mode, when switching the gear shift pattern of the multistage gear transmission from "EV 2nd ICE 2nd" to "EV 2nd ICE 3rd" in the first embodiment.

In FIG. 10, time t1 is the switching request time of the gear shift pattern. Time t2 is the command position change time of the second engagement clutch C2. Time t3 is the release start time of the second engagement clutch C2. Time t4 is the release completion time of the second engagement clutch C2. Time t5 is the command position change time of the first engagement clutch C1. Time t6 is the engagement start time of the first engagement clutch C1. Time t7 is the engagement completion time of the first engagement clutch C1. Time t8 is the gear shift pattern switching completion time. Time t2-time t3 is a response delay dead time of the second engagement clutch C2, and time t5-time t6 is the response delay dead time of the first engagement clutch C1.

When there is a switching request of the gear shift pattern from "EV 2nd ICE 2nd" to "EV 2nd ICE 3rd" at time t1, a reduction in the ICE torque from the internal combustion engine ICE and an increase of the MG1 torque from the first motor/generator MG1 are started. Then, when the MG1 torque changes from a negative torque to a positive torque to become an assist drive output at time t2, the command position for the second engagement clutch C2 is switched from engagement (Left) to disengagement. Then, the coupling sleeve 52 of the second engagement clutch C2 starts a stroke from the engagement position at time t3, and the coupling sleeve 52 of the second engagement clutch C2 reaches the disengaged position at time t4.

That is, the time during time t2-time t4 is set as the disengagement interval of the second engagement clutch C2, and a slight fluctuation in the longitudinal G characteristic is seen in the interval between time t3-time t4. Then, at time t4, the control mode of the second motor/generator MG2 is switched from torque control to rotational speed FB control.

At the time of release completion time t4 of the second engagement clutch C2, as illustrated in the rotational speed characteristic (Rev), the differential rotation speed (=C1 input/output differential rotation speed) between the actual motor rotation speed (=MG2 characteristic) and the target motor rotation speed (=Target rev) is greatly diverged, and an engagement movement of the first engagement clutch C1 cannot be started. Therefore, in the interval from time t4 to time t5, rotational speed FB control on the second motor/generator MG2 using the FB gains Kp, Ki set in accordance with the absolute value of the differential rotation speed |ε| is carried out. In this rotational speed FB control, by outputting a negative motor torque command for suppressing the actual motor rotation speed, the actual motor rotation speed (=MG2 characteristic) decreases and approaches the target motor rotation speed (Target rev) having a gentle upward gradient, and the divergence width of the differential rotation speed is reduced with the lapse of time from time t4 to time t5. Then, when C1 rotation synchronization state is determined at time t5, the command position for the first engagement clutch C1 is switched from disengagement to engagement (Right). Then, the coupling sleeve 51 of the first engagement clutch C1 starts a stroke from the N position at time t5, and the top faces of the dog teeth 51b, 57b of the first engagement clutch C1 abut and start to mesh at time t6. Furthermore, the coupling sleeve 51 of the first engagement clutch C1 ends the mesh-and-engage movement and reaches the engagement completion position at time t7.

That is, the interval from time t4 to time t7 is set as the rotational speed FB control interval on the second motor/generator MG2, during which is carried out rotational speed FB control for changing FB gain large to FB gain small. Then, the time during time t5-time t7 is set as the engagement interval of the first engagement clutch C1, and of this engagement interval, a slight fluctuation in the longitudinal G characteristic is seen in the interval between time t6-time t7. Then, at time t7, the control mode of the second motor/generator MG2 is switched from rotational speed FB control to torque control.

When the second engagement clutch C2 is returned to torque control at the first engagement clutch C1 engagement completion time t7, the MG2 torque of the second motor/generator MG2 is returned to zero. In FIG. 10, the MG2 torque is returned to zero, but it may be caused to generate power or to carry out powering, depending the driving state. Then, the ICE torque of the internal combustion engine ICE is increased from zero torque and the MG1 torque of the first motor/generator MG1 is reduced from the driving force guaranteeing torque, and switching of the gear shift pattern is completed at time t8, when the total torque of the ICE torque and the MG1 torque matches the required driving force.

Characteristic Action of the Shift Control

The first embodiment is configured such that, when carrying out rotational speed FB control on the first motor/generator MG1 at the time of a gear shift request to a gear shift stage at which the engagement clutch first engagement clutch C1 is meshingly engaged, the efficacy of the rotational speed FB control is made to be less than before starting of the meshingly engagement, when the meshing engagement of the first engagement clutch C1 is started. That is, an engagement instruction is output when the rotational speed FB control causes the differential rotation speed of the first engagement clutch C1 to be within a range of synchronization determination rotational speeds. The coupling sleeve 51 of the first engagement clutch C1 starts a stroke in the meshing engagement direction based on the engagement instruction, and opposing dog teeth 51b, 57b start meshing engagement at an intermediate position of the stroke. When the first engagement clutch C1 enters a meshing engagement state, the actual differential rotation speed of the first engagement clutch C1 becomes zero, and the rotational speed deviation, which is the difference between the actual differential rotation speed and the target differential rotation speed, continues to be generated as long as the first engagement clutch C1 maintains the meshing engagement state. Then, when the rotational speed deviation continues to be generated in the first engagement clutch C1, the rotational speed FB control will try to output a high FB torque in order to increase the actual differential rotation speed of the first engagement clutch C1 (zero rotation speed) to the synchronization determination rotational speed, which is the target differential rotation speed. Particularly, in the FB integral control of the rotational speed FB control, if a rotational speed deviation remains, the deviation component of each control cycle is accumulated, and the FB torque is increased along with the lapse of time after the first engagement clutch C1 enters an engaged state. That is, when the first engagement clutch C1 enters an engaged state, the FB torque becomes a high torque in a short period of time. However, when meshing engagement of the first engagement clutch C1 is started, the efficacy of the rotational speed FB control is made less than before starting of the meshingly engagement. Accordingly, even when the first engagement clutch C1 enters a meshing engagement state and the rotational speed deviation continues to be generated, the output of the FB torque by the rotational speed FB control is suppressed low. As a result, it is possible to reduce vehicle shock caused by FB torque output due to rotational speed FB control, at the time of switching the gear shift pattern for meshing engagement the first engagement clutch C1, based on a rotation synchronization determination.

The first embodiment is configured such that, when the meshing engagement of the first engagement clutch C1 is started, the FB gains Kp, Ki used in the rotational speed FB control are made to be less than before starting of the meshingly engagement. That is, since the FB torque that is output by the rotational speed FB control becomes a torque corresponding to a value obtained by multiplying the FB gains Kp, Ki by the rotational speed deviation, even if the rotational speed deviation of continues to be generated on the one hand, the FB torque becomes small if the FB gains Kp, Ki are small values on the other hand. When the FB gains Kp, Ki are decreased by starting the meshing engagement of the first engagement clutch C1, the FB gains Kp, Ki are decreased from a timing before the opposing dog teeth 51b, 57b of the first engagement clutch C1 come in contact, which has the following advantages. First, by decreasing the FB gains Kp, Ki by starting the meshing engagement of the first engagement clutch C1, a high-precision engagement determination means (sensor) for detecting the moment that the opposing dog teeth 51b, 57b of the first engagement clutch C1 come in physical contact becomes unnecessary. Secondly, if the changing of the efficacy of the FB gains Kp, Ki is delayed with respect to the contact of the opposing dog teeth 51b, 57b of the first engagement clutch C1, generation of shock cannot be avoided. However, by reducing the FB gains Kp, Ki by starting the meshing engagement of the first engagement clutch C1, it is possible to avoid the generation of shock in advance with a time margin.

Figure 6:
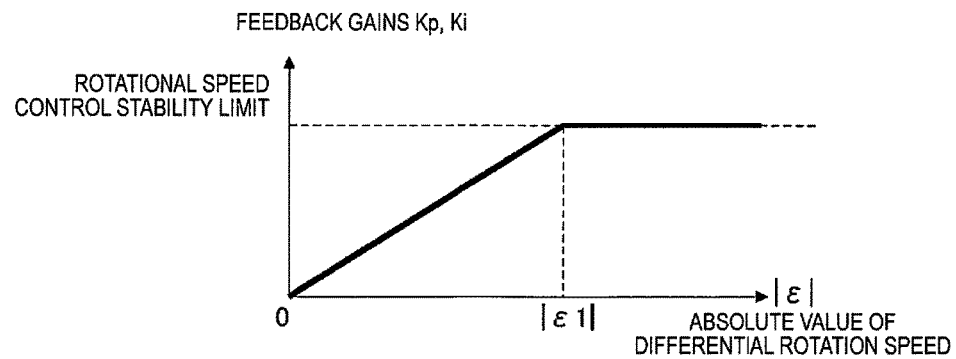
FIG. 6 is a first FB gain characteristic graph, illustrating the relationship of FB gain with respect to the absolute value of the differential rotation speed used in the shift control process of the first embodiment.
Figure 7:
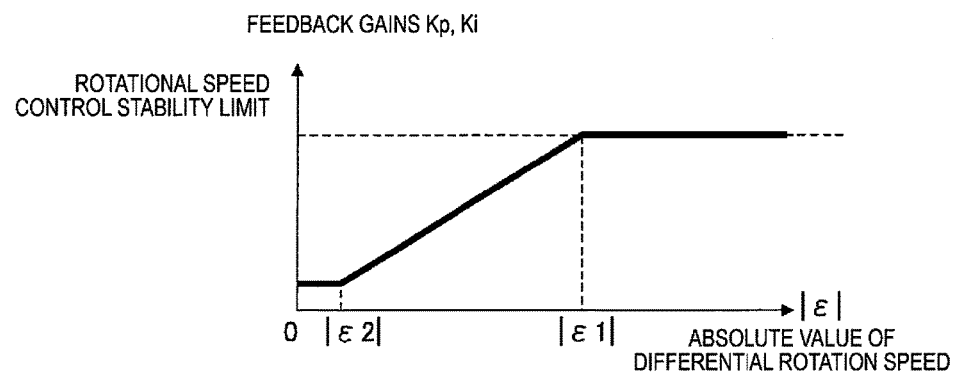
FIG. 7 is a second FB gain characteristic graph, illustrating the relationship of FB gain with respect to the absolute value of the differential rotation speed used in the shift control process of the first embodiment.

The first embodiment is configured such that, when the rotational speed FB control on the second motor/generator MG2 is started, a rotational speed FB control using FB gains Kp, Ki, set to be smaller values as the absolute value of the differential rotation speed |ε| is decreased, is carried out until it is determined that the meshing engagement of the first engagement clutch C1 are complete. That is, after the rotational speed FB control on the second motor/generator MG2 is started and the first engagement clutch C1 enters a meshing engagement state, the absolute value of the differential rotation speed |ε| becomes zero, and the FB gains Kp, Ki used in the rotational speed FB control become the smallest values, including zero (FIG. 6, FIG. 7). Then, a rotational speed FB control of the smallest value including zero is continued to be carried out until it is determined that the meshing engagement of the first engagement clutch C1 are complete. Accordingly, it is possible to reliably reduce vehicle shock caused by FB torque that is output due to rotational speed FB control on the second motor/generator MG2.

In the first embodiment, in Step S6 of FIG. 5, when the absolute value of the differential rotation speed |ε| is in a range that exceeds |ε1|, gain values are set at the rotational speed FB control stability limit range. Then, the FB gains Kp, Ki are set according to a characteristic in which the gain value is decreased together with the reduction in the absolute value of the differential rotation speed |ε|, when the absolute value of the differential rotation speed |ε| becomes equal to or less than |ε1|. That is, in the region where the absolute value of the differential rotation speed |ε| exceeds |ε1|, the FB gains are set to gain values in the rotational speed FB control stability limit range; therefore, the differential rotation speed of the first engagement clutch C1 is reduced in the convergence direction with good response, without degrading stability of the rotational speed FB control. On the other hand, when entering the region where the absolute value of the differential rotation speed $|\varepsilon|$ is less than $|\varepsilon1|$, by setting gain values that are gradually decreased together with the reduction in the absolute value of the differential rotation speed $|\varepsilon|$, the meshing engagement of the first engagement clutch C1 is started in a state in which generation of FB torque is suppressed. Therefore, securing the rotation synchronization response of the first engagement clutch C1 and reducing the vehicle shock caused by FB torque can be achieved at the same time.

Next, the effects are described. The effects listed below can be obtained by the transmission control device of a hybrid vehicle according to the first embodiment.

(1) A transmission (multistage gear transmission 1) that achieves a plurality of gear shift stages (gear shift pattern) is provided in a drive system from a power source (internal combustion engine ICE, first motor/generator MG1, second motor/generator MG2) to driving wheels 19. The transmission (multistage gear transmission 1) has engagement clutches C1, C2, and C3 as shifting elements that meshingly engage by movement from a disengaged position to switch between gear shift stages. In this vehicle (hybrid vehicle), rotational speed FB control on an electric motor (second motor/generator MG2) connected to an engagement clutch (first engagement clutch C1) is carried out when there is a gear shift request to a gear shift stage at which the engagement clutch (first engagement clutch C1) is meshingly engaged. A transmission controller (transmission control unit 23, FIG. 5) is provided for outputting a meshing engagement instruction to the engagement clutch (first engagement clutch C1) when the differential rotation speed of the engagement clutch (first engagement clutch C1) becomes within a range of a synchronization determination rotational speed. Upon executing the rotational speed FB control on the electric motor (second motor/generator MG2), the transmission controller (transmission control unit 23, FIG. 5) makes the efficacy of rotational speed FB control less than before starting of the meshingly engagement, when the meshing engagement of the engagement clutch (first engagement clutch C1) is started. As a result, it is possible to reduce vehicle shock caused by FB torque that is output due to rotational speed FB control, at the time of shifting when the engagement clutch (first engagement clutch C1) is meshingly engaged (at the time of switching the gear shift pattern of the multistage gear transmission 1), based on a rotation synchronization determination.

(2) When the meshing engagement of the engagement clutch (first engagement clutch C1) is started, the transmission controller (transmission control unit 23, FIG. 5) reduces the FB gains Kp, Ki used in the rotational speed FB control on the electric motor (second motor/generator MG2) to be less than before starting of the meshingly engagement. Accordingly, in addition to the effect of (1), a high precision engagement determination means (sensor) becomes unnecessary, and it is possible to avoid generation of shock caused by a delay in the efficacy change of the FB gains Kp, Ki, by reducing the FB gains Kp, Ki when the meshing engagement is started.

(3) The transmission controller (transmission control unit 23, FIG. 5) has a first FB gain setting section (Step S6) that sets the FB gains Kp, Ki to smaller values, as the absolute value of the differential rotation speed $|\varepsilon|$, between the actual motor rotation speed $(\omega_R)$ of the electric motor (second motor/generator MG2) and the target motor rotation speed $(\omega_T)$ corresponding to the synchronization determination rotational speed of the engagement clutch (first engagement clutch C1), is reduced. When the rotational speed FB control on the electric motor (second motor/generator MG2) is started, a rotational speed FB control using FB gains Kp, Ki set by the first FB gain setting section (Step S6) is carried out until it is determined that the meshing engagement of the engagement clutch (first engagement clutch C1) are complete. Accordingly, in addition to the effect of (2), it is possible to reliably reduce vehicle shock caused by FB torque that is output due to rotational speed FB control on the electric motor (second motor/generator MG2).

(4) The first FB gain setting section (Step S6) sets the gain values at the rotational speed FB control stability limit range when in a region where the absolute value of the differential rotation speed $|\varepsilon|$ exceeds a predetermined value $|\varepsilon1|$. When the absolute value of the differential rotation speed $|\varepsilon|$ becomes equal to or less than the predetermined value $|\varepsilon1|$, FB gains Kp, Ki are set according to a characteristic that reduces the gain value together with the reduction in the absolute value of the differential rotation speed $|\varepsilon|$ (FIG. 6, FIG. 7). Therefore, in addition to the effect of (3), securing the rotation synchronization response of the engagement clutch (first engagement clutch C1) and reducing the vehicle shock caused by FB torque can be achieved at the same time.

Second Embodiment

The second embodiment is an example in which the rotational speed FB control by the second motor/generator MG2 is stopped when meshing engagement of the first engagement clutch C1 is started. Since the "overall system configuration," the "configuration of the shift control system," and the "configuration of the gear shift patterns" of the transmission control device of a hybrid vehicle according to the second embodiment are the same configurations as those shown in FIGS. 1 to 4 of the first embodiment, the drawings and descriptions thereof are omitted. The "configuration of the shift control process" of the second embodiment will be described below based on FIG. 11.

Configuration of the Shift Control Process

Figure 11:
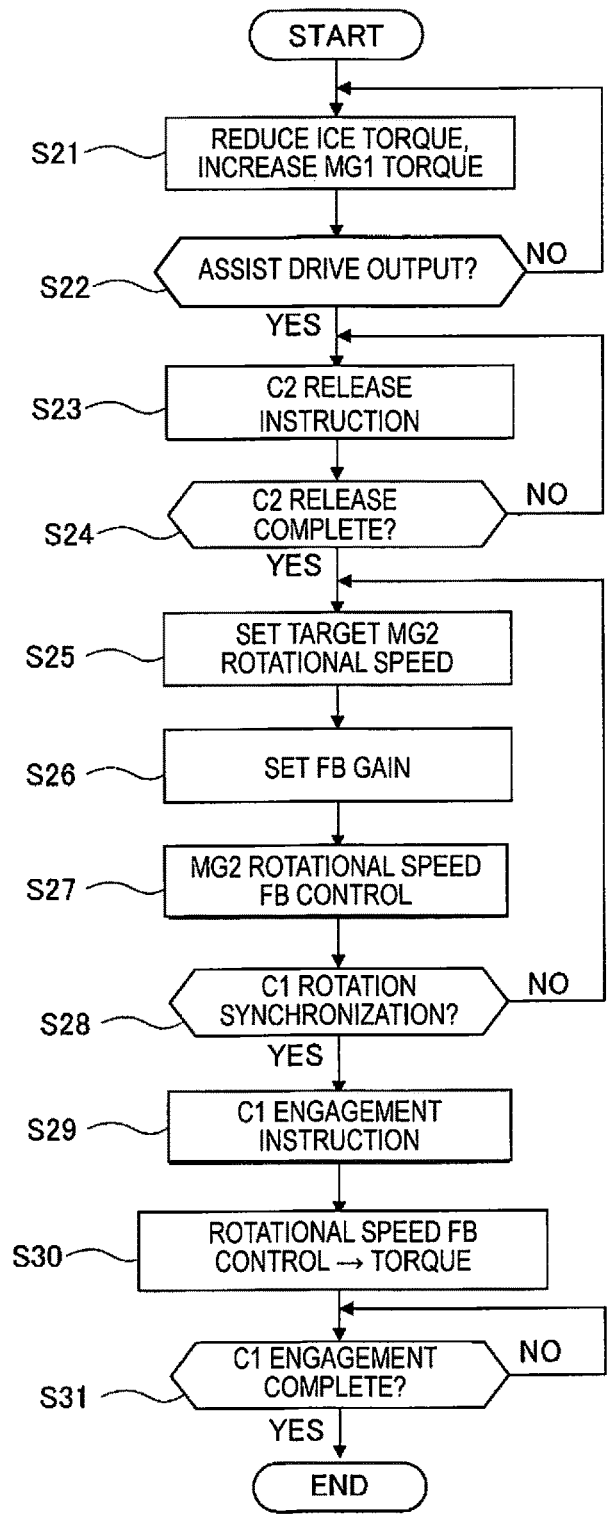
FIG. 11 is a flowchart illustrating the flow of a shift control process carried out in a transmission control unit of a second embodiment.

FIG. 11 illustrates the flow of a shift control process carried out in the transmission control unit 23 (shift control means) of the second embodiment. Each of the steps in FIG. 11, which shows one example of the configuration of the shift control process, will be described below. Since each of the steps of Step S21-Step S25 and Step S27-Step S29 are steps that carry out the same processes as each of the steps of Step S1-Step S5 and Step S7-Step S9 in FIG. 5, the descriptions thereof are omitted.

In Step S26, following setting of the target MG2 rotational speed in Step S25, a proportional element FB gain Kp and an integral element FB gain Ki to be used when carrying out rotational speed FB control on the second motor/generator MG2 are set, and the process proceeds to Step S27. Here, upon setting the FB gains Kp, Ki, the FB gains Kp, Ki are set to a constant value in the rotational speed FB control stability limit, regardless of the magnitude of the absolute value of the differential rotation speed $|\varepsilon|$.

In Step S30, following a C1 engagement instruction in Step S29, rotational speed FB control on the second motor/generator MG2 is stopped, the control is transitioned to torque control, and the process proceeds to Step S31. As a result, the instruction torque for the second motor/generator MG2 at the final point in time at which the rotational speed FB control was carried out continues to be instructed. However, if the vehicle is accelerating or decelerating, the target motor rotation speed changes according to the vehicle speed. Accordingly, the instruction torque for the second motor/generator MG2 is set to a value obtained by adding a torque to realize the change amount of the target motor rotation speed to the instruction torque for the second motor/generator MG2 at the final point in time at which the rotational speed FB control was carried out. That is, a motor torque command value that realizes the motor torque ($T_M$) calculated based on the following formula (3) is output.

$$T_M = Jm \cdot d\omega_T \qquad (3)$$

"Jm" in the formula (3) above is the inertia from the second motor/generator MG2 to the input portion of the first engagement clutch C1, and "$d\omega_T$" is the differential value of the target input rotational speed ($\omega_T$) set in Step S25.

In Step S31, following the transition to torque control in Step S30, it is determined whether or not the engagement of the first engagement clutch C1 by meshing engagement are complete. If YES (C1 engagement complete), the process proceeds to End, and if NO (C1 engagement incomplete), the determination of Step S31 is repeated.

Next, the actions are described. The "action of the shift control process," the "action of the shift control," and the "characteristic action of the shift control" will be separately described, regarding the actions of the transmission control device of a hybrid vehicle according to the second embodiment.

Action of the Shift Control Process

The action of the shift control process when switching the gear shift pattern from "EV 2nd ICE 2nd" to "EV 2nd ICE 3rd" will be described below, based on the flowchart shown in FIG. 11. Since the processes of Step S21-Step S24 are the same as the first embodiment, the descriptions thereof are omitted.

When it is determined that C2 disengagement is complete in Step S24, the control mode of the second motor/generator MG2 is switched from torque control to rotational speed FB control, and the process proceeds from Step S25→Step S26→Step S27→Step S28. While it is being determined that C1 rotation is asynchronous in Step S28, the flow proceeding from Step S25→Step S26→Step S27→Step S28 is repeated. In this flow, the target MG2 rotational speed is set in Step S25, the FB gains Kp, Ki by constant values are set in Step S26, and the rotational speed FB control on the second motor/generator MG2 is carried out in Step S27.

Then, when C1 rotation synchronization is determined in Step S28, the process proceeds from Step S28 to Step S29→Step S30→Step S31. In this flow, an engagement instruction is output to the first engagement clutch C1 in Step S29, the rotational speed FB control on the second motor/generator MG2 is stopped and the control is transitioned to torque control in Step S30, and it is determined whether or not the engagement of the first engagement clutch C1 is complete in Step S31. Then, when it is determined that C1 engagement is complete in Step S31, the process proceeds to End.

Action of the Shift Control

Switching the gear shift pattern from "EV 2nd ICE 2nd" to "EV 2nd ICE 3rd" is achieved by releasing the second engagement clutch C2 from the "Left" position to the "N" position, and engaging the first engagement clutch C1 from the "N" position to the "Right" position, in the same manner as the first embodiment. The switching action of the gear shift pattern from "EV 2nd ICE 2nd" to "EV 2nd ICE 3rd" in the second embodiment will be described below based on FIG. 12.

Figure 12:
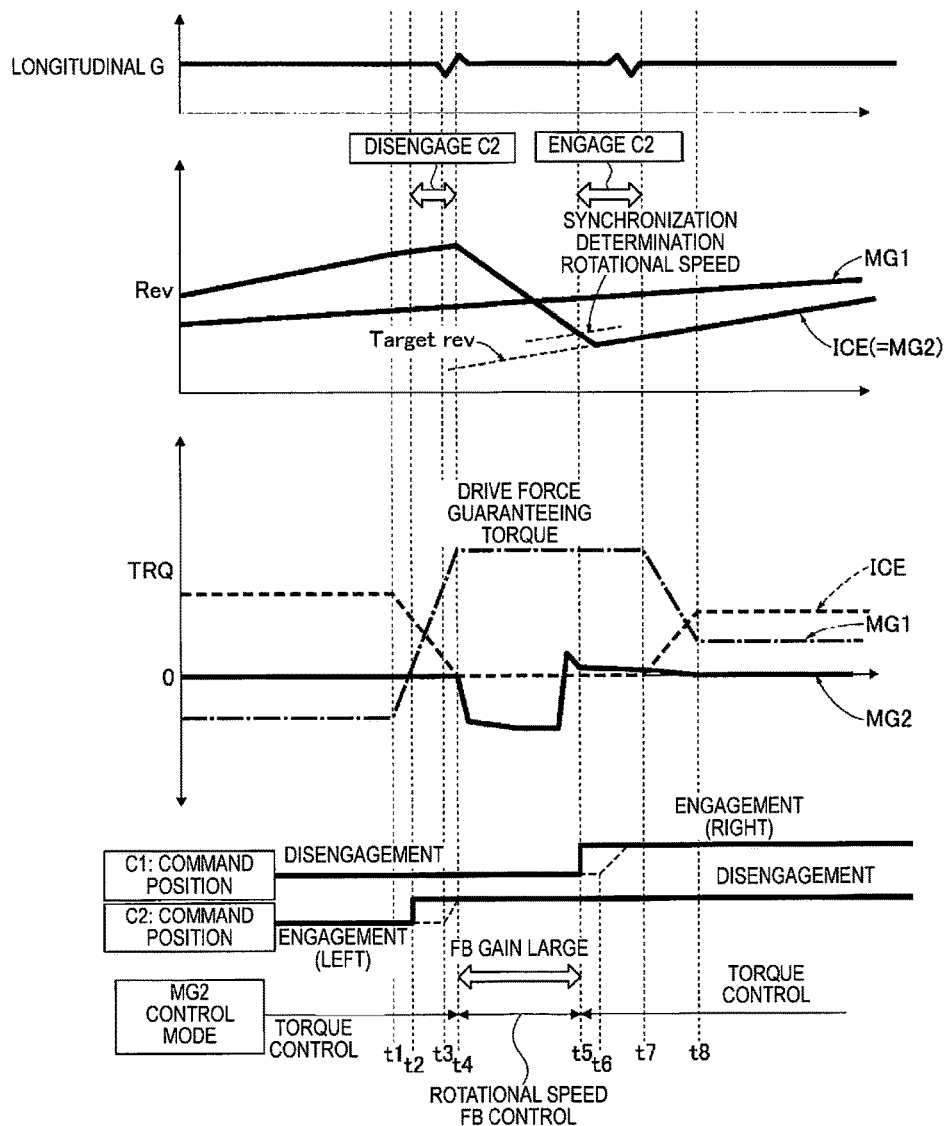
FIG. 12 is a time chart illustrating each of the characteristics of the longitudinal G/MG1 rotation speed/engine rotation speed (=MG2 rotation speed)/MG1 torque/engine torque/MG2 torque/C1 command position/C2 command position/MG2 control mode, when switching the gear shift pattern of the multistage gear transmission from "EV 2nd ICE 2nd" to "EV 2nd ICE 3rd" in the second embodiment.

In FIG. 12, time t1 is the switching request time of the gear shift pattern. Time t2 is the command position change time of the second engagement clutch C2. Time t3 is the release start time of the second engagement clutch C2. Time t4 is the release completion time of the second engagement clutch C2. Time t5 is the command position change time of the first engagement clutch C1. Time t6 is the engagement start time of the first engagement clutch C1. Time t7 is the engagement completion time of the first engagement clutch C1. Time t8 is the gear shift pattern switching completion time. Time t2-time t3 is a response delay dead time of the second engagement clutch C2, and time t5-time t6 is the response delay dead time of the first engagement clutch C1. Since from time t1-time t4 is the same as the first embodiment of FIG. 10, the description thereof will be omitted.

At the time of release completion time t4 of the second engagement clutch C2, as illustrated in the rotational speed characteristic (Rev), the differential rotation speed (=C1 input/output differential rotation speed) between the actual motor rotation speed (=MG2 characteristic) and the target motor rotation speed (=Target rev) is greatly diverged, and an engagement stroke of the first engagement clutch C1 cannot be started. Therefore, in the interval from time t4 to time t5, rotational speed FB control on the second motor/generator MG2 using the FB gains Kp, Ki set to constant values regardless of the absolute value of the differential rotation speed is carried out. In this rotational speed FB control, by outputting a negative motor torque command for suppressing the actual motor rotation speed, the actual motor rotation speed (=MG2 characteristic) decreases and approaches the target motor rotation speed (=Target rev) having a gentle upward gradient, and the divergence width of the differential rotation speed is reduced with the lapse of time from time t4 to time t5. Then, when C1 rotation synchronization state is determined at time t5, the command position for the first engagement clutch C1 is switched from disengagement to engagement (Right).

That is, the interval from time t4 to time t5 is set as the rotational speed FB control interval on the second motor/generator MG2, during which is carried out rotational speed FB control by FB gain large. Then, at time t5, the control mode of the second motor/generator MG2 is switched from rotational speed FB control to torque control. At time t5 when switching to torque control, the MG2 torque of the second motor/generator MG2 is returned to zero toward time t8. In FIG. 12, the MG2 torque is returned to zero, but it may be caused to generate power or to carry out powering, depending the driving state.

The coupling sleeve 51 of the first engagement clutch C1 starts a stroke from the N position at time t5, and the top faces of the dog teeth 51b, 57b of the first engagement clutch C1 abut and start to mesh at time t6. Furthermore, the coupling sleeve 51 of the first engagement clutch C1 ends the mesh-and-engage stroke and reaches the engagement completion position at time t7. At time t7 when the engagement of the first engagement clutch C1 is complete, the ICE torque of the internal combustion engine ICE is increased from zero torque and the MG1 torque of the first motor/generator MG1 is reduced from the driving force guaranteeing torque. Then, the switching of the gear shift pattern is completed at time t8 when the total torque of the ICE torque and the MG1 torque matches the required driving force. That is, the time during time t5-time t7 is set as the engagement interval of the first engagement clutch C1 by torque control, and, of this engagement interval, a slight fluctuation in the longitudinal G characteristic is seen in the interval between time t6-time t7.

Characteristic Action of the Shift Control

The second embodiment is configured such that the rotational speed FB control on the second motor/generator MG2 is stopped when meshing engagement of the first engagement clutch C1 is started. That is, by stopping the rotational speed FB control on the second motor/generator MG2 when meshing engagement of the first engagement clutch C1 is started, FB torque by the rotational speed FB control is not generated. It is thereby possible to prevent shock on the vehicle caused by FB torque.

The second embodiment is configured such that, when the rotational speed FB control on the second motor/generator MG2 is started, rotational speed FB control using the FB gains Kp, Ki according to values in the rotational speed FB control stability limit range is carried out until the meshing engagement of the first engagement clutch C1 is started. That is, by carrying out rotational speed FB control using FB gains Kp, Ki with high values until the meshing engagement of the first engagement clutch C1 is started, it is possible to converge the differential rotation of the first engagement clutch C1 to within the range of synchronization determination rotational speeds with good response.

The second embodiment is configured such that meshing engagement of the first engagement clutch C1 is considered as having started, when a meshing engagement instruction is output to the first engagement clutch C1. That is, by considering that meshing engagement of the first engagement clutch C1 has started at the time a meshing engagement instruction is output to the first engagement clutch C1, and stopping the rotational speed FB control, the following advantages are obtained. First, by stopping the rotational speed FB control when a meshing engagement instruction is output, a high-precision engagement determination means (sensor) for detecting the moment that the opposing dog teeth 51b, 57b of the first engagement clutch C1 come in physical contact becomes unnecessary. Secondly, if the stopping of the rotational speed FB control is delayed with respect to the contact of the opposing dog teeth 51b, 57b of the first engagement clutch C1, generation of shock cannot be avoided. However, by stopping the rotational speed FB control when a meshing engagement instruction is output, it is possible to avoid the generation of shock caused by FB torque in advance with a time margin. The other actions are the same as the first embodiment, so the descriptions thereof are omitted.

Next, the effects are described. The effects listed below can be obtained by the transmission control device of a hybrid vehicle according to the second embodiment.

(5) When the meshing engagement of the engagement clutch (first engagement clutch C1) is started, the transmission controller (transmission control unit 23, FIG. 11) stops the rotational speed FB control on the electric motor (second motor/generator MG2). Accordingly, in addition to the effect of (1) above, it is possible to reliably prevent generation of vehicle shock caused by FB torque.

(6) The transmission controller (transmission control unit 23, FIG. 11) has a second FB gain setting section (Step S26) that sets the FB gains Kp, Ki to gain values in the rotational speed FB control stability limit range, regardless of the absolute value of the differential rotation speed |ε| of the engagement clutch (first engagement clutch C1). When the rotational speed FB control on the electric motor (second motor/generator MG2) is started, a rotational speed FB control using FB gains Kp, Ki set by the second FB gain setting section (Step S26) is carried out until the meshing engagement of the engagement clutch (first engagement clutch C1) is started. Accordingly, in addition to the effect of (5) above, it is possible to converge the differential rotation of the engagement clutch (first engagement clutch C1) to within the range of synchronization determination rotational speeds with good response, when the rotational speed FB control on the electric motor (second motor/generator MG2) is started.

(7) The transmission controller (transmission control unit 23, FIG. 11) considers the meshing engagement of the engagement clutch (first engagement clutch C1) as having started, when a meshing engagement instruction is output to the engagement clutch (first engagement clutch C1). Accordingly, in addition to the effects of (1) to (6) above, a high precision engagement determination means (sensor) becomes unnecessary, and it is possible to carry out an efficacy change control of the rotational speed FB control to avoid generation of shock caused by FB torque in advance with a time margin, when the meshing engagement instruction is output.

The vehicle transmission control device of the present invention was described above based on the first and second embodiments, but specific configurations thereof are not limited to these embodiments, and various modifications and additions to the design can be made without departing from the scope of the invention according to each claim in the Claims.

In the first and second embodiments, an example was shown of a shift control by a switching transition of the gear shift pattern from "EV 2nd ICE 2nd" to "EV 2nd ICE 3rd" by disengaging the second engagement clutch C2 and engaging the first engagement clutch C1. However, the transmission controller may employ a shift control by a switching transition of the gear shift pattern from "EV 1st ICE-"→"EV 1st ICE 2nd," from "EV 1st ICE 2nd"→"EV 2nd ICE 2nd," from "EV 2nd ICE 4th,"→"EV 1st ICE 2nd," or from "EV 1st ICE-"→"EV 1st ICE 1st." In addition, numerous switching transitions of the gear shift pattern accompanying an engagement by movement to the left or to the right of any one of the first engagement clutch C1, the second engagement clutch C2, and the third engagement clutch C3 are possible, which can be roughly divided into two categories. First, when the first engagement clutch C1 and the second engagement clutch C2 are engaged, rotational speed FB control is carried out by the second motor/generator MG2. Secondly, when the third engagement clutch C3 is engaged, rotational speed FB control is carried out by the first motor/generator MG1. Then, while the content of the control carried out before and after the rotational speed FB control will be different depending on the content of the switching transition of the gear shift pattern, in all cases, the operations of the rotational speed FB control and the subsequent engagement of the engagement clutch will be as shown in the flowchart illustrated in FIG. 5 or FIG. 11.

In the first and second embodiments, an example was shown in which the transmission controller considers meshing engagement of the first engagement clutch C1 as having started, when a meshing engagement instruction is output to the engagement clutch. However, the shift control means may employ an example in which meshing engagement of the engagement clutch is considered as having started at the moment or the time immediately before the dog teeth come in contact, as long as it is possible to detect the moment or the time immediately before opposing dog teeth of the engagement clutch come in physical contact.

In the first embodiment, an example was shown in which the transmission controller uses FB gains Kp, Ki set to smaller values as the absolute value of the differential rotation speed $|\varepsilon|$ is reduced, when carrying out rotational speed FB control until the meshing engagement of the first engagement clutch C1 are completed. However, the shift control means may be an example in which a first FB gain of a high value is used until meshing engagement of the engagement clutch is started, and a second FB gain with a value lower than the first FB gain is used when meshing engagement of the engagement clutch is started, when carrying out rotational speed FB control until the meshing engagement of the engagement clutch are completed.

In the first and second embodiments, an example was shown in which the transmission comprises three engagement clutches C1, C2, and C3, and is a normally meshing multistage gear transmission 1 having a plurality of gear pairs with different transmission ratios. However, the transmission is not limited to the multistage gear transmission 1 shown in the first and second embodiments, and can be any transmission that achieves a plurality of gear shift stages, and that has an engagement clutch as a shifting element that meshingly engages by movement from a disengaged position to switch between gear shift stages.

In the first and second embodiments, an example was shown in which the shift control device of the present invention is applied to a hybrid vehicle comprising one engine, two motor/generators and a multistage gear transmission having three engagement clutches as drive system components. However, the transmission control device of the present invention of the present invention can be applied to other hybrid vehicles comprising, for example, one engine, one motor/generator and a transmission having an engagement clutch as drive system components. Additionally, the transmission control device can also be applied to electrically driven vehicles, such as electric vehicles and fuel cell vehicles that comprise two motor/generators and an engagement clutch. Additionally, the transmission control device can also be applied to an engine-equipped vehicle comprising an engine as a power source, a motor/generator for rotation synchronization, and a transmission having an engagement clutch.

The invention claimed is:

1. A vehicle transmission control device for a vehicle having a transmission that achieves a plurality of gear shift stages in a drive system from a power source to a driving wheel, in which the transmission has an engagement clutch as a shifting element that meshingly engages by movement from a disengaged position for switching between the gear shift stages, comprising:
a transmission controller configured to execute a rotational speed feedback control with respect to an electric motor connected to the engagement clutch at a time of a shift request to a gear shift stage at which the engagement clutch is meshingly engaged, and configured to output a meshing engagement instruction to the engagement clutch when a differential rotation speed of the engagement clutch comes within a range of a synchronization determination rotational speed that is set to a predetermined differential rotation speed that is not a zero rotational speed,
the rotational speed feedback control on the electric motor being a control that outputs a feedback torque to converge an actual motor rotation speed of the electric motor to a target motor rotation speed corresponding to the synchronization determination rotational speed, and
upon executing the rotational speed feedback control on the electric motor, the transmission controller being configured to reduce an efficacy of the rotational speed feedback control for starting meshingly engagement of the engagement clutch as compared to before starting of the meshingly engagement.

2. The vehicle transmission control device according to claim 1, wherein
the transmission controller is configured to reduce a feedback gain used in the rotational speed feedback control on the electric motor as compared to before starting of the meshingly engagement when the meshingly engagement of the engagement clutch is started.

3. The vehicle transmission control device according to claim 2, wherein
the transmission controller is configured to include a first feedback gain setting section that sets a feedback gain to a smaller value as an absolute value of a differential rotation speed between an actual motor rotation speed of the electric motor and a target motor rotation speed corresponding to a synchronization determination rotational speed of the engagement clutch is reduced, and
when starting the rotational speed feedback control on the electric motor, the transmission controller is configured to carry out the rotational speed feedback control using the feedback gain set by the first feedback gain setting section until a determination that the meshing engagement of the engagement clutch is complete.

4. The vehicle transmission control device according to claim 3, wherein
the first feedback gain setting section of the transmission controller is configured to a gain value of a rotational speed feedback control stability limit range when in a region where the absolute value of the differential rotation speed exceeds a predetermined value, and
when the absolute value of the differential rotation speed becomes equal to or less than the predetermined value, the transmission controller is configured to set the feedback gain according to a characteristic in which the gain value is decreased together with a reduction in the absolute value of the differential rotation speed.

5. The vehicle transmission control device according to claim 4, wherein
the transmission controller is configured to determine the meshing engagement of the engagement clutch as having started, when the meshing engagement instruction is output to the engagement clutch.

6. The vehicle transmission control device according to claim 3, wherein
the transmission controller is configured to determine the meshing engagement of the engagement clutch as having started, when the meshing engagement instruction is output to the engagement clutch.

7. The vehicle transmission control device according to claim 2, wherein
the transmission controller is configured to determine the meshing engagement of the engagement clutch as having started, when the meshing engagement instruction is output to the engagement clutch.

8. The vehicle transmission control device according to claim 1, wherein the transmission controller is configured to stop the rotational speed feedback control on the electric motor when the meshing engagement of the engagement clutch are started.

9. The vehicle transmission control device according to claim 8, wherein the transmission controller is configured to include a second feedback gain setting section that sets a feedback gain to a gain value in a rotational speed feedback control stability limit range regardless of the absolute value of the differential rotation speed of the engagement clutch, and when starting the rotational speed feedback control on the electric motor, the transmission controller is configured to carry out the rotational speed feedback control using the feedback gain set by the second feedback gain setting section until the meshing engagement of the engagement clutch is started.

10. The vehicle transmission control device according to claim 9, wherein the transmission controller is configured to determine the meshing engagement of the engagement clutch as having started, when the meshing engagement instruction is output to the engagement clutch.

11. The vehicle transmission control device according to claim 8, wherein the transmission controller is configured to determine the meshing engagement of the engagement clutch as having started, when the meshing engagement instruction is output to the engagement clutch.

12. The vehicle transmission control device according to claim 1, wherein the transmission controller is configured to determine the meshing engagement of the engagement clutch as having started, when the meshing engagement instruction is output to the engagement clutch.

* * * * *